(12) United States Patent
Kim et al.

(10) Patent No.: US 12,149,394 B2
(45) Date of Patent: Nov. 19, 2024

(54) APPARATUS AND METHOD FOR EXTENDED RANGE COMMUNICATION

(71) Applicant: SAMSUNG ELECTRONICS CO., LTD., Suwon-si (KR)

(72) Inventors: Myeongjin Kim, Seongnam-si (KR); Jinmin Kim, Hwaseong-si (KR); Eunsung Jeon, Seoul (KR); Wookbong Lee, San Jose, CA (US); Chulho Chung, Yongin-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 17/659,603

(22) Filed: Apr. 18, 2022

(65) Prior Publication Data

US 2022/0345349 A1    Oct. 27, 2022

Related U.S. Application Data

(60) Provisional application No. 63/178,166, filed on Apr. 22, 2021.

(30) Foreign Application Priority Data

Jul. 9, 2021   (KR) .................. 10-2021-0090488

(51) Int. Cl.
*H04L 27/26*   (2006.01)
*H04J 11/00*   (2006.01)
*H04L 27/00*   (2006.01)

(52) U.S. Cl.
CPC .......... *H04L 27/2643* (2013.01); *H04J 11/00* (2013.01); *H04L 27/0008* (2013.01)

(58) Field of Classification Search
CPC ............ H04L 27/2643; H04L 27/0008; H04L 27/26132; H04L 27/2602; H04L 27/2628;
(Continued)

(56) References Cited

U.S. PATENT DOCUMENTS

| 8,867,653 B2 | 10/2014 | Zhang et al. |
| 10,470,128 B2 | 11/2019 | Noh et al. |

(Continued)

FOREIGN PATENT DOCUMENTS

| EP | 3800943 | 4/2021 |
| KR | 10-1967412 | 4/2019 |
| WO | 2019235861 | 12/2019 |

OTHER PUBLICATIONS

Extended European Search Report dated Oct. 4, 2022 in corresponding European Patent Application Serial No. 22169588.5 (7 pages).

*Primary Examiner* — Mohamed A Kamara
(74) *Attorney, Agent, or Firm* — F. CHAU & ASSOCIATES, LLC

(57) ABSTRACT

A second apparatus for wireless communication includes: a transceiver; and a processing circuit configured to receive, from a first apparatus via the transceiver, a physical layer protocol data unit (PPDU) including a first signal field having a fixed length and a second signal field having a variable length. The second signal field includes an orthogonal frequency-division multiplexing (OFDM) symbol block including at least one OFDM symbol, and one or more repetitions of the OFDM symbol block.

18 Claims, 36 Drawing Sheets

(58) Field of Classification Search
CPC . H04L 27/3483; H04L 1/0005; H04L 1/0011; H04L 1/1812; H04J 11/00; H04W 84/12
See application file for complete search history.

(56) References Cited

U.S. PATENT DOCUMENTS

| | | |
|---|---|---|
| 10,917,209 B2 | 2/2021 | Lim et al. |
| 11,463,293 B2 * | 10/2022 | Yu .......................... H04W 84/12 |
| 11,546,938 B2 * | 1/2023 | Chen ................... H04W 74/002 |
| 11,902,066 B2 * | 2/2024 | Lim ...................... H04L 1/0003 |
| 2010/0111145 A1 * | 5/2010 | Trachewsky .......... H04L 1/0041 |
| | | 375/220 |
| 2014/0328435 A1 | 11/2014 | You et al. |
| 2014/0362935 A1 | 12/2014 | Porat et al. |
| 2015/0131527 A1 * | 5/2015 | Kenney ............... H04L 27/2613 |
| | | 370/328 |
| 2019/0372814 A1 * | 12/2019 | Zhang ................... H04W 84/12 |
| 2020/0136884 A1 | 4/2020 | Park et al. |
| 2020/0177425 A1 | 6/2020 | Chen et al. |
| 2020/0329526 A1 | 10/2020 | Takada |
| 2020/0413482 A1 | 12/2020 | Takada |
| 2021/0014018 A1 | 1/2021 | Noh et al. |
| 2021/0045117 A1 | 2/2021 | Chen et al. |
| 2021/0111935 A1 | 4/2021 | Chen et al. |
| 2021/0212035 A1 * | 7/2021 | Son ..................... H04W 72/121 |

* cited by examiner

FIG. 5

| U-SIG Fields | | | | Description | | |
|---|---|---|---|---|---|---|
| UL/DL | PPDU Type and Compression Mode | EHT PPDU Type | EHT-SIG Present? | RU Allocation Table Present? | Total Number of Users in PPDU | Note |
| 0 (DL) | 0 | EHT MU | Yes | Yes | ≥1 | DL OFDMA (including non-MU-MIMO and MU-MIMO) |
| | 1 | EHT MU | Yes | No | 1 | SU or NDP (Not to AP. Typically "DL") |
| | 2 | EHT MU | Yes | No | ≥1 | DL MU-MIMO (non-OFDMA) |
| | 3 | – | – | – | – | Validate |
| 1 (UL) | 0 | EHT TB | No | – | ≥1 | UL OFDMA (including non-MU-MIMO and MU-MIMO) |
| | 1 | EHT MU | Yes | No | 1 | SU or NDP (To AP, i.e., "UL") |
| | 2-3 | – | – | – | – | Validate |

FIG. 6

| PPDU bandwidth | Cases | Puncturing pattern | Field value |
|---|---|---|---|
| 20 MHz | No puncturing | [1 1 1 1] | 0 |
| 40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| | Both 80 MHz and 40 MHz puncturing | [x x x 1 1 1 1 1] | 13 |
| | | [x x 1 x 1 1 1 1] | 14 |
| | | [x x 1 1 x 1 1 1] | 15 |
| | | [x x 1 1 1 x 1 1] | 16 |
| | | [x x 1 1 1 1 x 1] | 17 |
| | | [x x 1 1 1 1 1 x] | 18 |
| | | [x 1 1 1 1 1 x x] | 19 |
| | | [1 x 1 1 1 1 x x] | 20 |
| | | [1 1 x 1 1 1 x x] | 21 |
| | | [1 1 1 x 1 1 x x] | 22 |
| | | [1 1 1 1 x 1 x x] | 23 |
| | | [1 1 1 1 1 x x x] | 24 |

FIG. 8C

| Spatial Reuse | GI+LTF Size | Number of EHT-LTF Symbols | NSS | BF | Disregard | CRC | Tail |

| Common field for non-OFDMA transmission to a single user and non-OFDMA transmission to multiple users | User field | CRC | Tail |

| B0 | B10 B11 | B14 B15 | B16 | B19 B20 | B21 |
|---|---|---|---|---|---|
| STA-ID | MCS | R | NSTS | BF | C |

FIG. 10B

| B0 | B10 B11 | B14 B15 | B16 | B21 |
|---|---|---|---|---|
| STA-ID | MCS | C | Spatial Configuration | |

FIG. 15

| U-SIG Fields | | | | Description | | |
|---|---|---|---|---|---|---|
| UL/DL | PPDU Type and Compression Mode | EHT PPDU Type | EHT-SIG Present? | RU Allocation Table Present? | Total Number of Users in PPDU | Note |
| 0 (DL) | 0 | EHT ER | Yes | Yes | ≥1 | ER DL OFDMA (including non-MU-MIMO and MU-MIMO) |
| | 1 | EHT ER | Yes | No | 1 | ER SU or ER NDP (Not to AP. Typically "DL") |
| | 2 | EHT ER | Yes | No | ≥1 | ER DL MU-MIMO (non-OFDMA) |
| | 3 | − | − | − | − | Validate |
| 1 (UL) | − | − | − | − | − | − |
| | 1 | EHT ER | Yes | No | 1 | ER SU or ER NDP (To AP, i.e., "UL") |
| | 2-3 | − | − | − | − | Validate |

APPARATUS AND METHOD FOR EXTENDED RANGE COMMUNICATION

CROSS-REFERENCE TO RELATED APPLICATIONS

This application claims the benefit of U.S. Provisional Patent Application No. 63/178,166, filed on Apr. 22, 2021, in the U.S. Patent and Trademark Office, and the benefit of Korean Patent Application No. 10-2021-0090488, filed on Jul. 9, 2021, in the Korean Intellectual Property Office, the disclosures of which are incorporated by reference herein in their entireties.

TECHNICAL FIELD

This disclosure relates generally to wireless communication and more particularly, to an apparatus and method for extended range orthogonal frequency division multiplexing (OFDM)-based communication, e.g., within a wireless local area network (WLAN) system.

Discussion of the Related Art

A wireless local area network (WLAN) system connects two or more devices to each other, and typically to the Internet, in a local environment such as a home, a building, an airplane, or a campus. Currently, WLAN technology is based on the institute of electrical and electronics engineers (IEEE) 802.11 standard. The IEEE 802.11 standard has been developed into 802.11b, 802.11a, 802.11g, 802.11n, 802.11ac, and 802.11ax versions and may support a transmission speed of up to 1 Gbyte/s by using OFDM technology. In a typical WLAN, an access point (AP) serves as a gateway to connect user devices such as smartphones and laptops to the Internet.

In 802.11ac, data may be simultaneously transmitted to a plurality of users through a multi-user multi-input multi-output (MU-MIMO) scheme. In 802.11ax (referred to as high efficiency (HE)), by dividing and providing an available subcarrier to users through use of orthogonal frequency-division multiple access (OFDMA) technology as well as the MU-MIMO, multiple access is implemented. Accordingly, a WLAN system to which 802.11ax is applied may effectively support communication local areas and outdoors crowded with many users.

802.11be, which is referred to as extremely high throughput (EHT), is intended to support a 6 GHz unlicensed frequency band, utilize a bandwidth up to 320 MHz per channel, introduce a hybrid automatic repeat and request (HARQ), and support MIMO up to 16×16. With this capability, a next-generation WLAN system is expected to effectively support low latency and ultra-fast transmission with performance metrics similar to new radio (NR) 5G technology.

SUMMARY

Embodiments of the inventive concept provide a wireless communication apparatus and method utilizing a preamble designed for extended range communication.

According to an aspect of the inventive concept, there is provided a wireless communication method by a first apparatus, the wireless communication method including generating a first signal field having a fixed length, generating a second signal field having a variable length, and transmitting a physical layer protocol data unit (PPDU) including the first signal field and the second signal field to a second apparatus. Generating the second signal field includes generating a bitstream; generating an encoded block by encoding the bitstream; generating a modulated block by modulating the encoded block; generating, from the modulated block, an OFDM symbol block including at least one OFDM symbol, and arranging the OFDM symbol block and one or more repetitions of the OFDM symbol block within the second signal field.

According to another aspect of the inventive concept, there is provided a wireless communication method by a second apparatus, the wireless communication method including receiving, from a first apparatus, a PPDU including a first signal field having a fixed length and a second signal field having a variable length, identifying first information included in the first signal field, based on a pattern repeated in the first signal field, identifying second information included in the second signal field, based on a pattern repeated in the second signal field, and processing the PPDU, based on the first information and the second information. Identifying the second information includes an OFDM symbol block including at least one OFDM symbol, and identifying one or more repetitions of the OFDM symbol block.

According to another aspect of the inventive concept, there is provided a second apparatus for wireless communication including a transceiver, and a processing circuit. The processing circuit is configured to receive, from a first apparatus via the transceiver, a PPDU including a first signal field having a fixed length and a second signal field having a variable length. The second signal field includes an OFDM symbol block including at least one OFDM symbol, and one or more repetitions of the OFDM symbol block.

According to another aspect of the inventive concept, there is provided a wireless communication method by a first apparatus, the wireless communication method including generating a first signal field having a fixed length, generating a second signal field having a variable length, and transmitting a PPDU including the first signal field and the second signal field to a second apparatus. Generating the second signal field includes generating a bitstream, generating an encoded block by encoding the bitstream, generating an encoded block sequence by repeating the encoded block, generating a modulated block by modulating the encoded block sequence, and generating the second signal field to include one or more OFDM symbols from the modulated block.

According to another aspect of the inventive concept, there is provided a wireless communication method by a second apparatus, the wireless communication method including receiving, from a first apparatus, a PPDU including a first signal field having a fixed length and a second signal field having a variable length, identifying first information included in the first signal field, based on a pattern repeated in the first signal field, identifying second information included in the second signal field, based on a pattern repeated in the second signal field, and processing the PPDU, based on the first information and the second information. Identifying the second information includes recovering a modulated block from at least one OFDM symbol of the second signal field, and identifying at least one repeated encoded block by demodulating the modulated block.

According to another aspect of the inventive concept, there is provided a second apparatus for wireless communication, the second apparatus including a transceiver and a processing circuit, the processing circuit being configured to receive, from a first apparatus via the transceiver, a PPDU including a first signal field having a fixed length and a second signal field having a variable length. The second signal field includes at least one OFDM symbol representing a block sequence including an encoded block and one or more repetitions of the encoded block.

BRIEF DESCRIPTION OF THE DRAWINGS

Embodiments of the inventive concept will be more clearly understood from the following detailed description taken in conjunction with the accompanying drawings in which:

FIG. 5 is a table showing encoding of a PPDU type and a compression mode field, according to an embodiment;

FIG. 6 is a table showing encoding of a punctured channel information field according to an embodiment;

FIGS. 8A, 8B and 8C are diagrams of common fields according to embodiments;

FIGS. 9A and 9B are diagrams of examples of a block including a user field, according to embodiments;

FIGS. 10A and 10B are diagrams of examples of a user field, according to embodiments;

FIG. 15 is a table showing encoding of a PPDU type and a compression mode field, according to an embodiment;

DETAILED DESCRIPTION OF EMBODIMENTS

Figure 1:
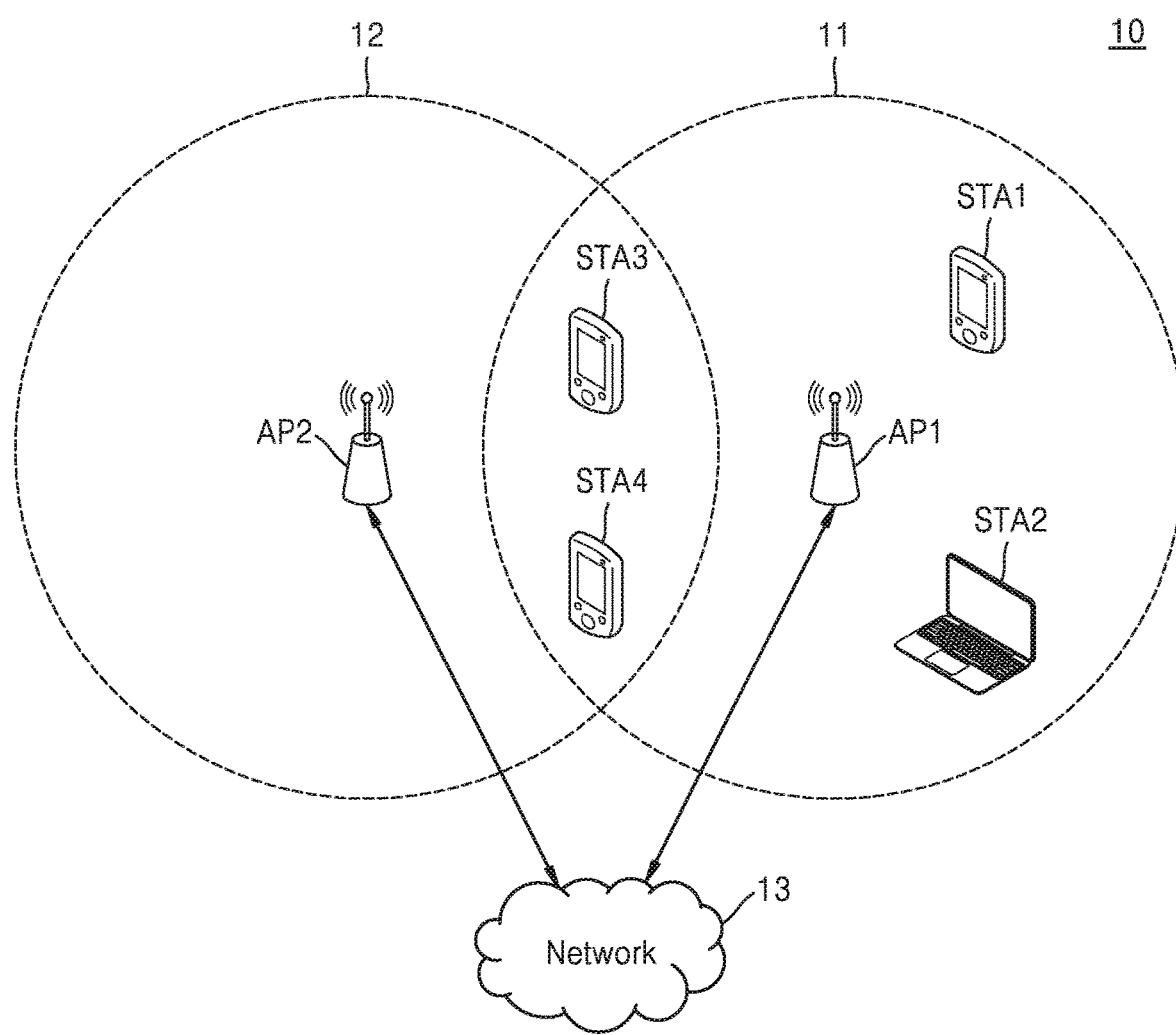
FIG. 1 is a diagram illustrating a wireless communication system according to an embodiment.

FIG. 1 is a diagram illustrating a wireless communication system 10 according to an embodiment of the inventive concept. FIG. 1 illustrates a wireless local area network (WLAN) system as an example of the wireless communication system 10.

In specifically describing embodiments of the inventive concept, an orthogonal frequency division multiplexing (OFDM) or orthogonal frequency division multiplexing access (OFDMA)-based wireless communication system, in particular, the IEEE 802.11 standard, is to be mainly described. However, the gist of the inventive concept may be applied to other communication systems with a similar technological background and channel type (for example, a cellular communication system such as long term evolution (LTE), LTE-Advanced (LTE-A), new radio (NR), wireless broadband (WiBro), or global system for mobile communication (GSM) or a short-distance communication system such as Bluetooth or near-field communication (NFC)), through slight modification of the disclosed embodiments, which modification may be determined by one of ordinary skill in the art to which the inventive concept pertains.

Referring to FIG. 1, the wireless communication system 10 may include first and second access points AP1 and AP2, a first station STA1, a second station STA2, a third station STA3, and a fourth station STA4. The first and second access points AP1 and AP2 may connect to a network 13 such as the Internet or an Internet protocol (IP) network. The first access point AP1 may provide access to the network 13 to the first station STA1, the second station STA2, the third station STA3, and the fourth station STA4 within a first coverage area 11, and the second access point AP2 may also provide access to the network 13 to the third and fourth stations STA3 and STA4 within a second coverage area 12. According to some embodiments, the first and second access points AP1 and AP2 may communicate with at least one of the first station STA1, the second station STA2, the third station STA3, and the fourth station STA4, based on wireless fidelity (Wi-Fi) or any other WLAN access technology.

An access point may be referred to as a router, a gateway, etc., and a station may be referred to as a mobile station, a subscriber station, a terminal, a mobile terminal, a wireless terminal, user equipment, a user, etc. The station may be a portable device, such as a mobile phone, a laptop computer, a wearable device, etc., or may be a stationary device, such as a desktop computer, a smart TV, etc. Herein, the station may be referred to as a first apparatus, and the access point may be referred to as a second apparatus or a third apparatus. Examples of the access point and the station will be described below with reference to FIG. 2.

The access point may allocate at least one resource unit (RU) to at least one station. The access point may transmit data through at least one allocated resource unit, and at least one station may receive data through at least one allocated resource unit. In 802.11ax (hereafter, HE), the access point may allocate a single resource unit to at least one station, while in 802.11be (hereafter, EHT) or next-generation IEEE 802.11 standards (hereafter, EHT+), the access point may allocate a multi-resource unit (MRU) including two or more resource units to at least one station. For example, the first access point AP1 may allocate the MRU to at least one of the first station STA1, the second station STA2, the third station STA3, and the fourth station STA4 and may transmit data through the allocated MRU.

According to some embodiments, the access point and the station may support extended range transmission. For example, a transmitter may transmit a signal including repeated patterns to a remote receiver, and, despite a weak channel condition, the receiver may identify information included in the signal with high accuracy, based on the repeated patterns. Accordingly, the first coverage area 11 and the second coverage area 12 may each be extended. As will be described later with reference to FIG. 3 and the like, a preamble of a physical layer protocol data unit (PPDU) may include pieces of information used to process the PPDU, and accordingly it is desirable for the pieces of information included in the preamble to be accurately transmitted to the transmitter.

As will be described below, a preamble including repeated patterns may be used for extended range transmission, and accordingly, information included in the preamble may be more accurately and reliably transmitted to a remote receiver. In addition, the receiver may accurately identify the number of repetitions of the pattern included in the preamble, and thus may accurately identify and process a pattern received from a remote transmitter. The length of the preamble including the repeated patterns may be shortened, and thus the overhead of extended range transmission may be reduced. The receiver may combine repeated patterns with each other, and thus the complexity of extended range transmission may be reduced. Due to high reliability of extended range communication, the coverage of wireless communication may be extended. For instance, in one example method, a first OFDM symbol block (at least one OFDM symbol) may be generated, which represents an encoded block sequence, e.g., original bits ("systematic bits") of the preamble, encoded using redundant bits in a forward error correction (FEC) encoding process. A second OFDM symbol block, which is a repetition of the first OFDM symbol block, may be concatenated with the first OFDM symbol block. The first and second OFDM symbol blocks may be generated in form of first and second baseband waveforms, respectively, and may be transmitted by modulating an RF carrier. The modulated RF carrier may be received at the receiver and demodulated to derive first and second received waveforms corresponding to the first and second baseband waveforms. The first and second received waveforms may be averaged, thereby generating an averaged waveform. When the averaged waveform is demodulated, de-mapped and decoded to generate corresponding bits, the encoded bits may be recovered with less errors than that achievable by processing the first waveform alone.

In an alternative example method, the first received waveform, and one or more repeated waveforms, are processed independently at the receiver to derive a first received encoded block sequence and one or more second received encoded block sequences. In a noisy/weak signal channel, the first received encoded block sequence may not be decoded successfully to recover all of the original bits. However, one of the repeated block sequences may be successfully decoded, whereby original bits may be recovered using the successfully decoded block sequence.

In another example to provide extended range operation, a first encoded block representing original bits of the preamble is repeated to generate a second encoded block, which is concatenated with the first encoded block to generate an encoded block sequence. The encoded block sequence is converted to an OFDM symbol block which is then transmitted to the receiver. When the receiver demodulates, de-maps and decodes the OFDM symbol block, it may recover two sets of decoded bits that, in the absence of any errors, would each perfectly recover the original bits. However, bit errors in one or both of the recovered sets of bits may occur in a noisy/weak signal channel. Through use of a comparison technique for the two sets of decoded bits, the BER of a resulting decoded set of bits may be reduced relative to that achievable by receiving and processing an OFDM symbol block representing just the first encoded block. As a result, the range of suitably accurate communication may be extended.

Embodiments of the inventive concept will now be described by mainly referring to EHT, but embodiments of the inventive concept may be applied to other protocol standards, for example, EHT+.

Figure 2:
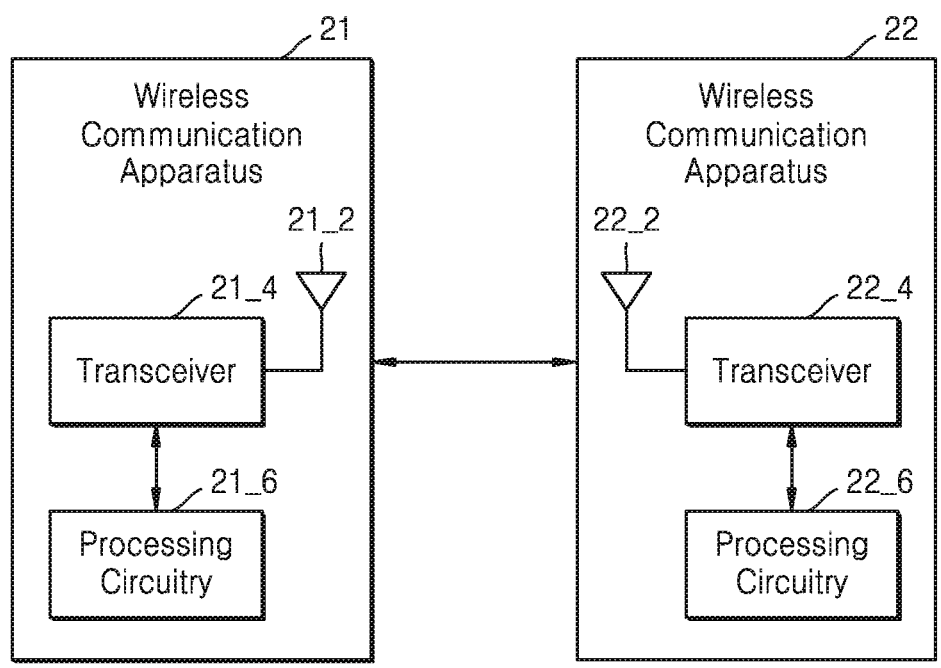
FIG. 2 is a block diagram of a wireless communication system according to an embodiment.

FIG. 2 is a block diagram of a wireless communication system 20 according to an embodiment of the inventive concept. FIG. 2 illustrates a first wireless communication apparatus 21 and a second wireless communication apparatus 22 that communicate with each other in the wireless communication system 20. Each of the first and second wireless communication apparatus 21 and 22 may be any device that communicates in the wireless communication system 20 and may be referred to as a device for wireless communication. Each of the first and second wireless communication apparatus 21 and 22 may be an access point or a station of a WLAN system.

The first wireless communication apparatus 21 may include an antenna 21_2, a transceiver 21_4, and a processing circuitry 21_6. The antenna 21_2, the transceiver 21_4, and the processing circuitry 21_6 may be included in one package or may be included in different packages, respectively. The second wireless communication apparatus 22 may include an antenna 22_2, a transceiver 22_4, and a processing circuitry 22_6. Hereinafter, redundant descriptions of the first wireless communication apparatus 21 and the second wireless communication apparatus 22 will be omitted.

The antenna 21_2 may receive a signal from the second wireless communication apparatus 22 and provide the signal to the transceiver 21_4, and may transmit a signal provided from the transceiver 21_4 to the second wireless communication apparatus 22. According to some embodiments, the antenna 21_2 may include a plurality of antennas for multiple input multiple output (MIMO). According to some embodiments, the antenna 21_2 may also include a phased array for beamforming.

The transceiver 21_4 may process a signal received from the second wireless communication apparatus 22 through the antenna 21_2 and may provide the processed signal to the processing circuitry 21_6. The transceiver 21_4 may process the signal provided from the processing circuitry 21_6 and output the processed signal through the antenna 21_2. According to some embodiments, the transceiver 21_4 may include an analog circuit such as a low noise amplifier, a mixer, a filter, a power amplifier, an oscillator, etc. According to some embodiments, the transceiver 21_4 may process a signal received from the antenna 21_2 and/or a signal received from the processing circuitry 21_6, under the control of the processing circuitry 21_6.

The processing circuitry 21_6 may extract information transmitted by the second wireless communication apparatus 22 by processing the signal received from the transceiver 21_4. For example, the processing circuitry 21_6 may extract information by demodulating and/or decoding the signal received from the transceiver 21_4. The processing circuitry 21_6 may generate a signal including information to be transmitted to the second wireless communication apparatus 22, and provide the signal to the transceiver 21_4. For example, the processing circuitry 21_6 may provide, to the transceiver 21_4, a signal generated by encoding and/or modulating data to be transmitted to the second wireless communication apparatus 22. According to some embodiments, the processing circuitry 21_6 may include a programmable component such as a central processing unit (CPU) or a digital signal processor (DSP); a reconfigurable component such as a field programmable gate array (FPGA); or a component that provides a fixed function, such as an intellectual property (IP) core. According to some embodiments, the processing circuitry 21_6 may include or access memory that stores data and/or a series of instructions.

Herein, the transceiver 21_4 and/or the processing circuitry 21_6 performing operations may be referred to as the first wireless communication apparatus 21 performing the corresponding operations. Accordingly, operations performed by the access point may be performed by a transceiver and/or processing circuitry included in the access point, and operations performed by the station may be performed by a transceiver and/or processing circuitry included in the station.

Figure 3:
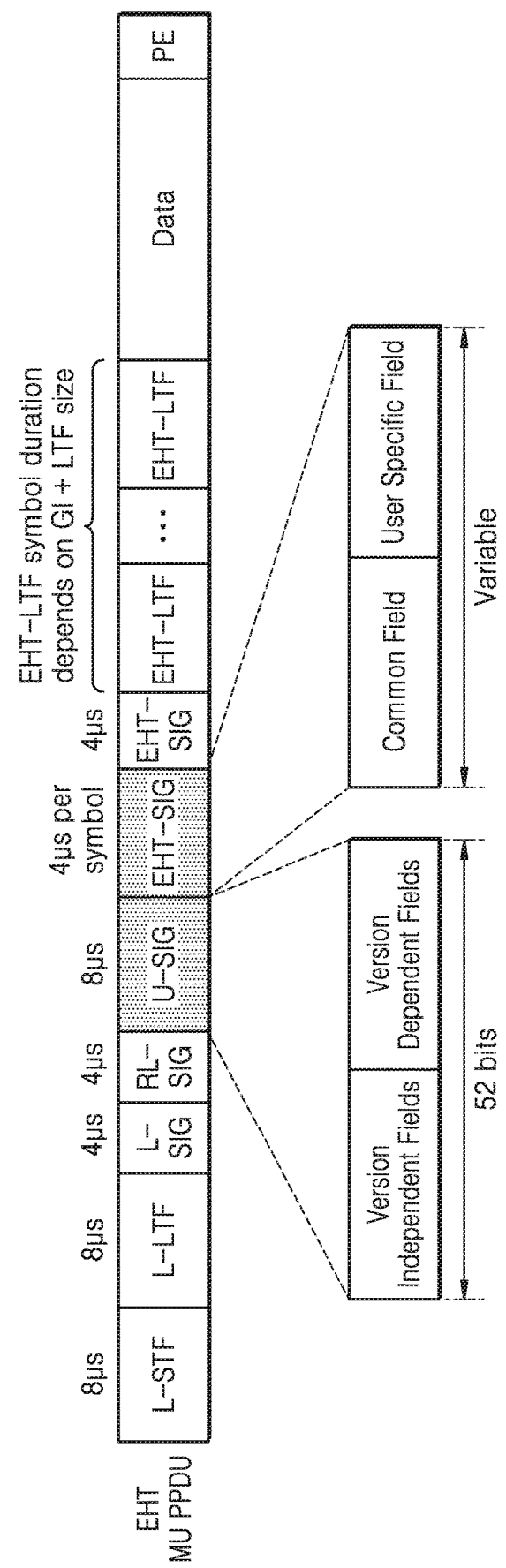
FIG. 3 is a diagram of a physical layer protocol data unit (PPDU) according to an embodiment.

FIG. 3 is a diagram of a PPDU according to an embodiment. In detail, FIG. 3 illustrates a structure of an EHT MU PPDU. High efficiency (HE) may define a HE MU PPDU and a HE single user (SU) PPDU, but an extremely high throughput (EHT) may not define the EHT SU PPDU and transmit the EHT MU PPDU to a single user. The EHT MU PPDU may be set in a compressed mode or a non-compressed mode and may include OFDM symbols in the non-compressed mode.

Referring to FIG. 3, the EHT MU PPDU may include a preamble including training fields and signaling fields and a payload including a data field. In the preamble, the EHT MU PPDU may include a legacy-short training field (L-STF), a legacy-long training field (L-LTF), a legacy-signal (L-SIG) field, a repeated legacy-signal (RL-SIG) field, a universal signal (U-SIG) field, an EHT-SIG field, an extremely high throughput-short training field (EHT-STF), and an extremely high throughput-long training field (EHT-LTF). The EHT MU PPDU may include a data field and a packet extension (PE) field in the payload. Herein, the U-SIG field may be simply expressed as a U-SIG, and may be interchangeably referred to as a "first signal field". The EHT-SIG field may be simply expressed as an EHT-SIG, and may be interchangeably referred to as a second signal field. Herein, the term "signal field" refers to a field within a data unit, that is utilized at the receiver to properly identify and decode data included within the data unit.

The L-STF may include a short training OFDM symbol and may be used for frame detection, automatic gain control (AGC), diversity detection, and coarse frequency/time synchronization. The L-LTF may include a long training OFDM symbol and may be used for fine frequency/time synchronization and channel estimation. The L-SIG field may be used to transmit control information, and may include information regarding a data rate and a data length. According to some embodiments, the L-SIG field may be repeated in the RL-SIG field.

The U-SIG field (or the U-SIG) may include control information common to at least one station receiving the EHT MU PPDU, and may correspond to HE-SIG-A of the HE. For example, as shown in FIG. 3, the U-SIG field may include version-independent fields and version-dependent fields. According to some embodiments, the U-SIG field may further include fields and reserved bits that respectively correspond to a cyclic redundancy check (CRC) and a tail. The version-independent fields may include static locations and bit definition in different generations and/or physical versions. According to some embodiments, differently from the EHT-SIG field described below, the U-SIG field may be modulated according to a single modulation scheme, for example, binary phase-shift keying (BPSK). An example of the U-SIG field will be described below with reference to FIG. 4.

The EHT-SIG field may have a variable modulation coding scheme (MCS) and length and may correspond to HE-SIG-B of the HE. For example, as shown in FIG. 3, when the EHT MU PPDU is transmitted to multiple users, the EHT-SIG field may include a common field including common control information and a user specific field including control information dependent on a user. As shown in FIG. 3, the U-SIG field may have a fixed length (e.g., about 8 μs), but the EHT-SIG field may have a variable length. The common field may include a U-SIG overflow, the total number of non-OFDMA users, and a RU allocation subfield (RUA). A user specific field for the non-MU MIMO may include an STA-ID subfield, an MCS subfield, an NSTS subfield, a Beamformed subfield, and a coding subfield, and a user specific field for the MU-MIMO may include an STA-ID subfield, an MCS subfield, a coding subfield, and a spatial configuration subfield. According to some embodiments, the EHT-SIG field may be modulated according to one of two or more modulation schemes such as BPSK and quadrature binary phase shift keying (QBPSK).

Figure 4:
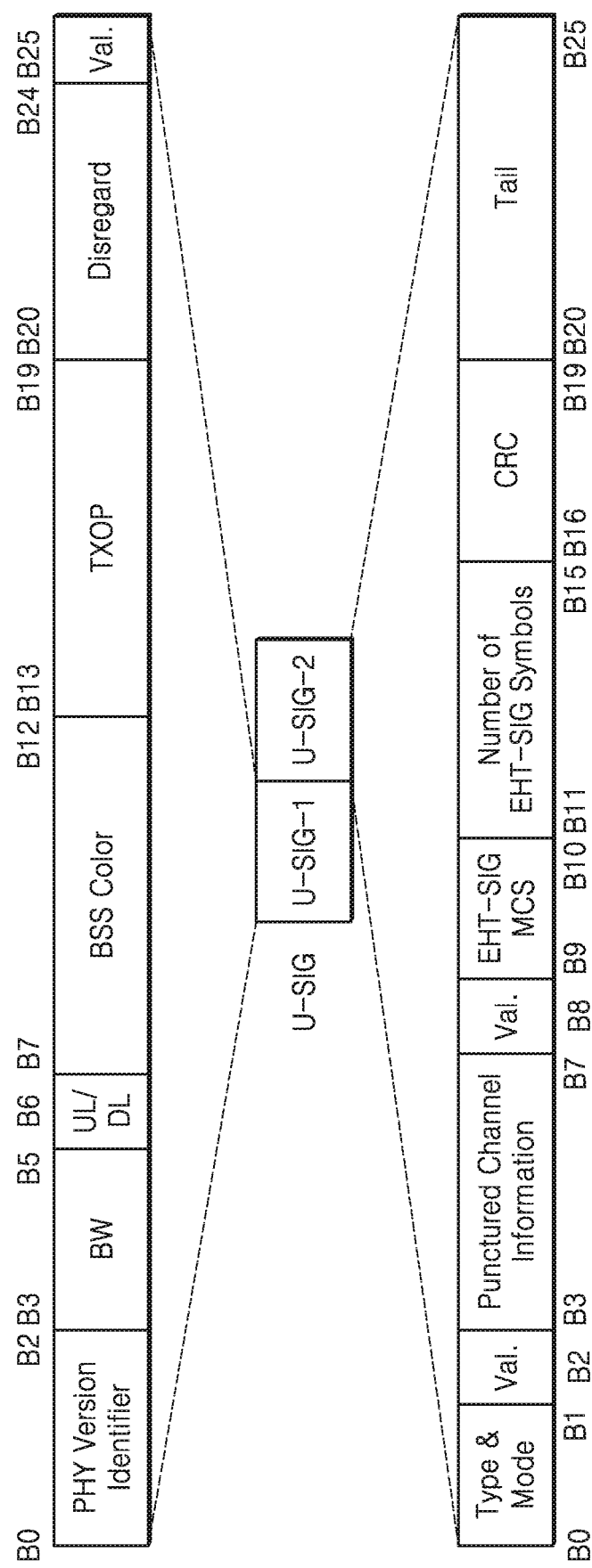
FIG. 4 is a diagram of a universal signal (U-SIG) field according to an embodiment.

FIG. 4 is a diagram of a U-SIG field according to an embodiment. In detail, FIG. 4 illustrates a U-SIG field included in the EHT MU PPDU, and, as described above with reference to FIG. 3, the U-SIG field may be followed by the EHT-SIG field.

Referring to FIG. 4, the U-SIG field may include U-SIG-1 and U-SIG-2. U-SIG-1 and the U-SIG-2 may correspond to two OFDM symbols, respectively, and each of the U-SIG-1 and the U-SIG-2 may correspond to 26 bits as illustrated in FIG. 4. The U-SIG-1 may include version-independent fields such as a 3-bit physical version identifier field, a 3-bit bandwidth field, a 1-bit uplink/downlink (UL/DL) field, a 6-bit BSS color field, a 7-bit TXOP field, and a 1-bit validate field. The U-SIG-2 may include version-dependent fields such as a 2-bit PPDU type and compression mode field, a 5-bit punctured channel information field, a 2-bit EHT-SIG MCS field, a 5-bit EHT-SIG symbol number field, a 4-bit CRC field, and a 6-bit tail field. The PPDU type and compression mode field will be described below with reference to FIG. 5, and the punctured channel information field will be described below with reference to FIG. 6.

FIG. 5 is a table showing encoding of a PPDU type and compression mode field, according to an embodiment. The table of FIG. 5 shows a UL/DL field included in the U-SIG-1 of the U-SIG field of FIG. 4 together with the PPDU type and compression mode field included in the U-SIG-2 of the U-SIG field of FIG. 4. As described above with reference to FIG. 4, the UL/DL field may have a 1-bit length, and the PPDU type and compression mode field may have a 2-bit length. Herein, the PPDU type and compression mode field may be simply referred to as a mode field.

Referring to FIG. 5, the UL/DL field may indicate a UL or a DL, and the PPDU type and compression mode field may indicate which mode the PPDU supports. As shown in FIG. 5, when the value of the PPDU type and compression mode field is 0, the PPDU may be based on OFDMA. When the value of the PPDU type and compression mode field is 1, the PPDU may be configured for a SU or a null data packet (NDP). When the value of the PPDU type and compression mode field is 2 in the DL, the PPDU may be configured for a MU MIMO based on non-OFDMA. In other words, when the value of the PPDU type and compression mode field is 0, the PPDU may be based on OFDMA, and when the PPDU type and compression mode field has a value other than 0, the PPDU may be based on OFDM.

FIG. 6 is a table showing encoding of a punctured channel information field according to an embodiment. The table of FIG. 6 shows puncturing patterns indicated by the punctured channel information field in non-OFDMA. As described above with reference to FIG. 4, the punctured channel information field may be included in the U-SIG-2 of the U-SIG field and may have a 5-bit length.

Referring to FIG. 6, puncturing may not be performed in bandwidths of 20 MHz and 40 MHz, and a value of the punctured channel information field may be 0. The value of the punctured channel information field in a bandwidth of 80 MHz may be one of 1 to 4 according to a puncturing pattern, the value of the punctured channel information field in a bandwidth of 160 MHz may be one of 0 to 12 according to a puncturing pattern, and the value of the punctured channel information field in a bandwidth of 320 MHz may be one of 0 to 24 according to a puncturing pattern. As a result, the punctured channel information field in the non-OFDMA may have a value between 0 and 24, and 5 bits of the punctured channel information field may be all used to indicate the puncturing patterns. Unlike the table of FIG. 6, 4 bits respectively indicating 20 MHz frequency subblocks from among 5 bits of the punctured channel information field may be used in OFDMA, and the other bit may not be used in OFDMA.

Figure 7A:
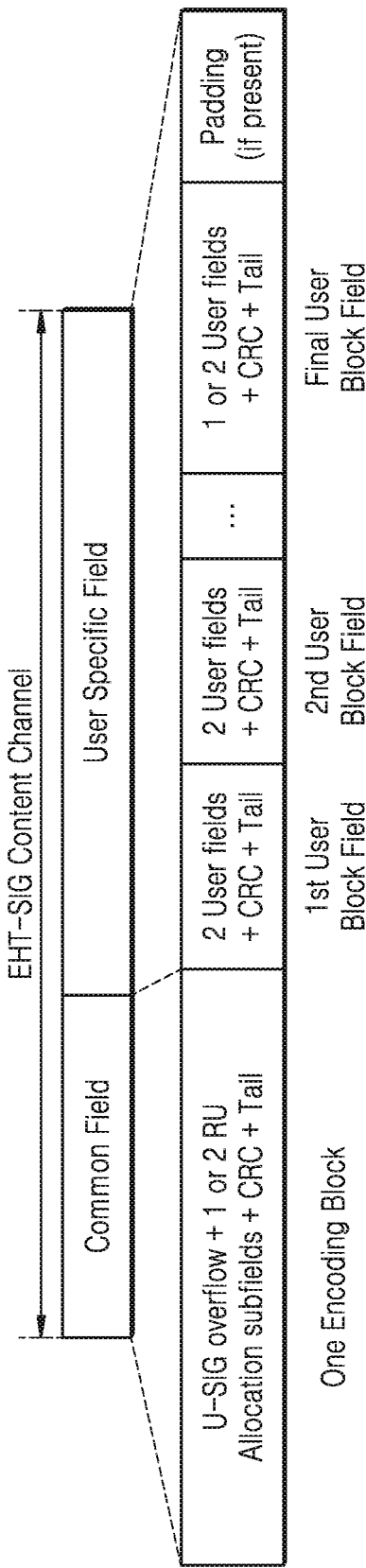
FIGS. 7A, 7B, 7C, 7D, 7E and 7F are diagrams of respective extremely high throughput-signal (EHT-SIG) content channels according to embodiments.
Figure 7B:
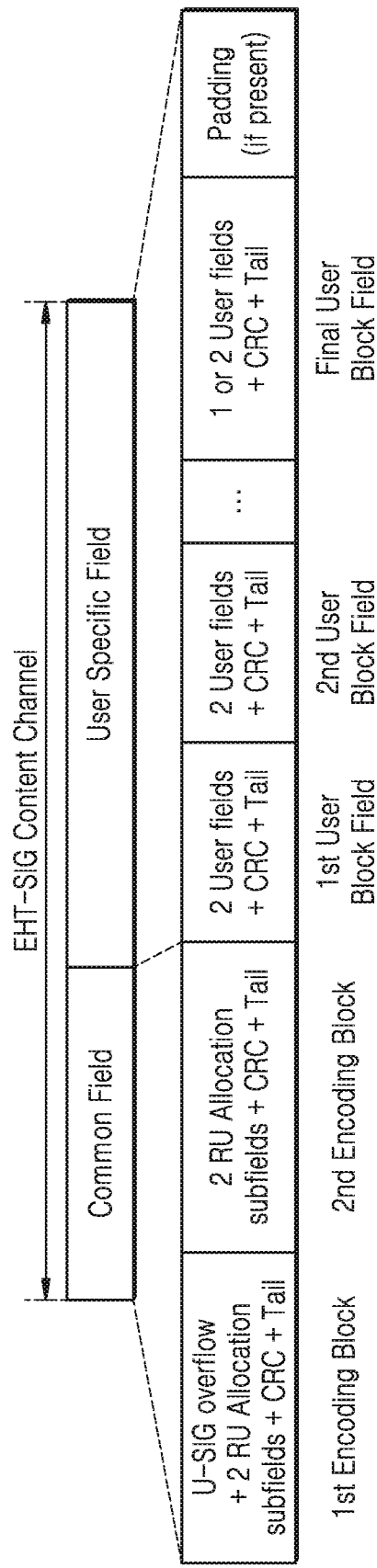
Figure 7C:
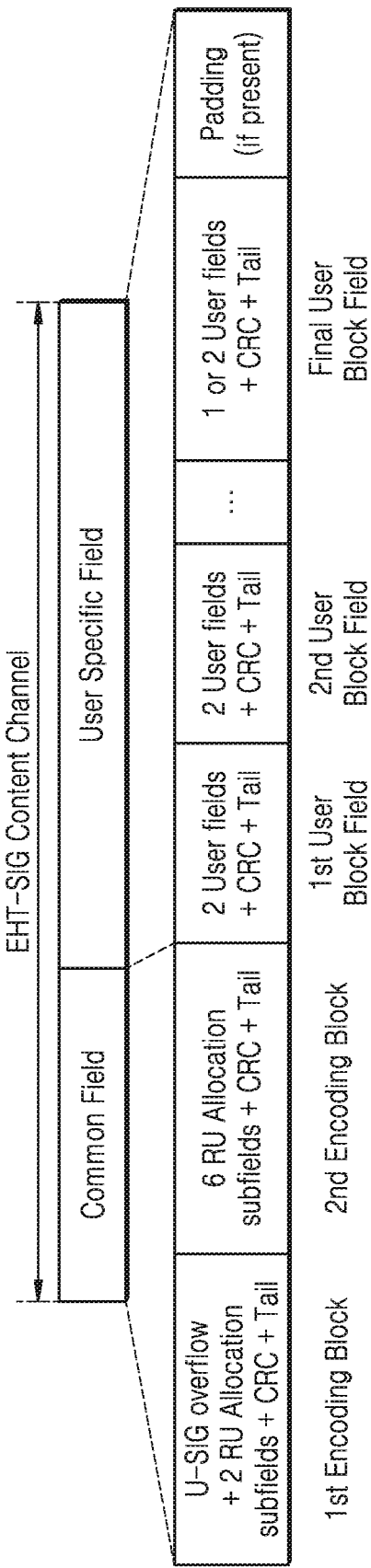
Figure 7D:
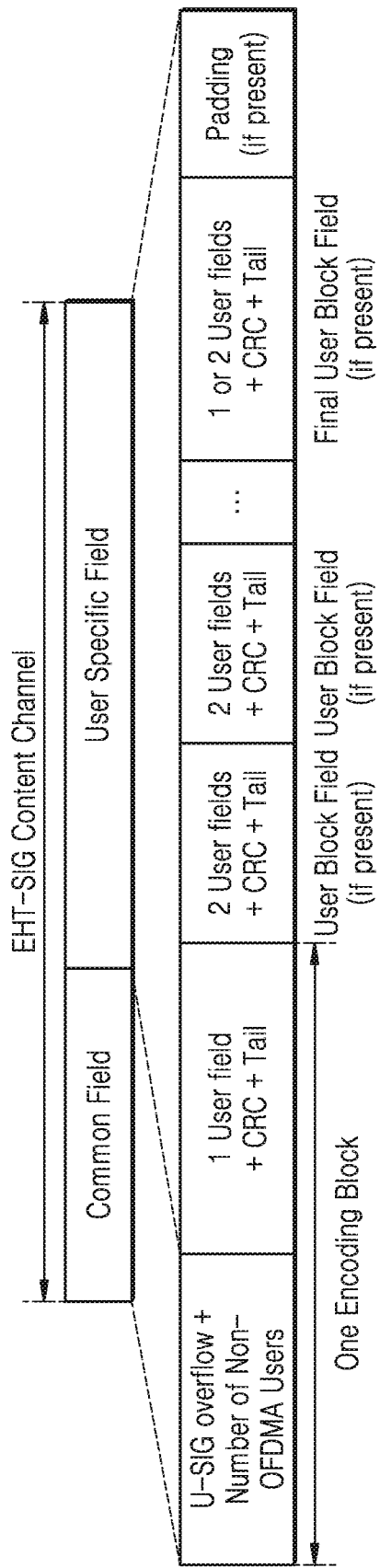
Figure 7E:
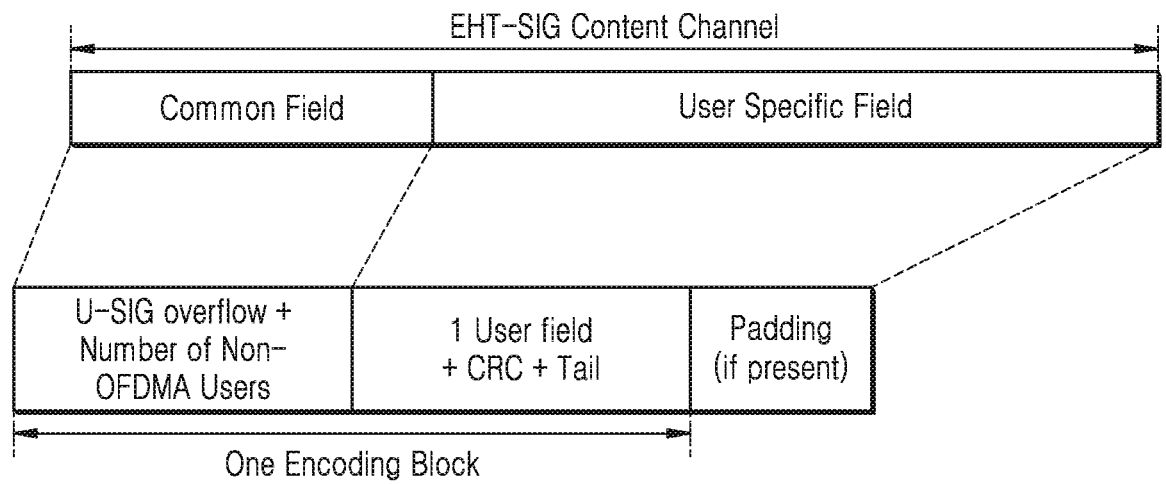
Figure 7F:
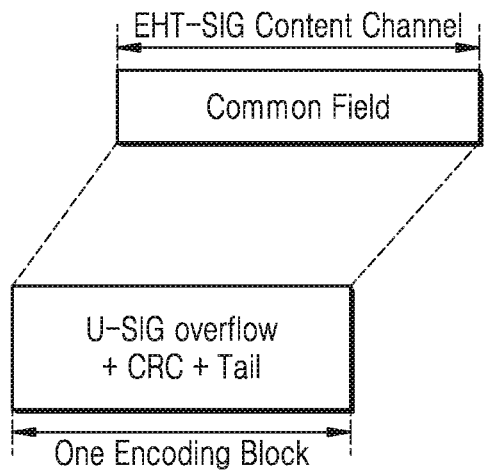

FIGS. 7A through 7F are diagrams of EHT-SIG content channels according to embodiments. FIG. 7A illustrates an EHT-SIG content channel format for OFDMA transmission in a bandwidth of 20 MHz, 40 MHz, or 80 MHz, FIG. 7B illustrates an EHT-SIG content channel format for the OFDMA transmission in a bandwidth of 160 MHz, and FIG. 7C illustrates an EHT-SIG content channel format for the OFDMA transmission in a bandwidth of 320 MHz. FIG. 7D illustrates an EHT-SIG content channel format for non-OFDMA transmission to multiple users, FIG. 7E illustrates an EHT-SIG content channel format for the non-OFDMA transmission to a single user, and FIG. 7F illustrates an EHT-SIG content channel format for an EHT sounding NDP.

The EHT-SIG field may include information necessary or desirable for stations to decode the EHT MU PPDU along with the U-SIG field. For example, in the EHT MU PPDU, the EHT-SIG field may include U-SIG overflow bits that are information commonly applied to all stations. The EHT-SIG field may include resource allocation information that a user uses to decode data by using a RU or a MRU allocated to the user. The EHT-SIG field for the EHT MU PPDU may have one EHT-SIG content channel in the bandwidth of 20 MHz, the EHT-SIG field for the EHT MU PPDU may have two EHT-SIG content channels in the bandwidth of 40 MHz or 80 MHz, and the EHT-SIG field for the EHT MU PPDU may have two EHT-SIG content channels in every 80 MHz frequency subblock in the bandwidth of 160 MHz or 320 MHz. Examples of the EHT-SIG content channels according to the bandwidths will be described below with reference to FIGS. 11A through 11D and FIGS. 12A through 12D.

As described above with reference to FIG. 5, the EHT-SIG field may have different structures depending on modes defined according to values of the UL/DL field and the PPDU type and compression mode field of the U-SIG field, for example, DL OFDMA transmission, DL non-OFDMA transmission to multiple users, the non-OFDMA transmission to a single user, or the EHT sounding NDP.

Referring to FIGS. 7A through 7C, when the value of the UL/DL field is 0 and the value of the PPDU type and compression mode field is 0, a PPDU for DL OFDMA transmission may be defined. When the bandwidth of the PPDU is equal to or greater than 40 MHz in the DL OFDMA transmission, user fields may be split across content channels according to the common field in each EHT-SIG content channel, and this split may be referred to as a dynamic split.

Referring to FIG. 7D, when the value of the UL/DL field is 0 and the value of the PPDU type and compression mode field is 2, a PPDU for the DL non-OFDMA transmission to multiple users may be defined. When the bandwidth of the PPDU is equal to or greater than 40 MHz in the DL non-OFDMA transmission to multiple users, the user fields may be split across the EHT-SIG content channels, and this split may be referred to as an equitable split.

Referring to FIG. 7E, when the value of the UL/DL field is 0 or 1 and the value of the PPDU type and compression mode field is 1, a PPDU for the non-OFDMA transmission to a single user may be defined. When the bandwidth of the PPDU is equal to or greater than 40 MHz in the non-OFDMA transmission to a single user, only the user field may be repeated across the EHT-SIG content channels. The common field and one user field may be encoded into one block in FIGS. 7D and 7E, and one encoding block will be described below with reference to FIG. 9A.

Referring to FIG. 7F, when the value of the UL/DL field is 0 or 1 and the value of the PPDU type and compression mode field is 1, a PPDU for the EHT sounding NDP may be defined. In the EHT sounding NDP, a user field may be omitted.

Figures 8A, 8B:
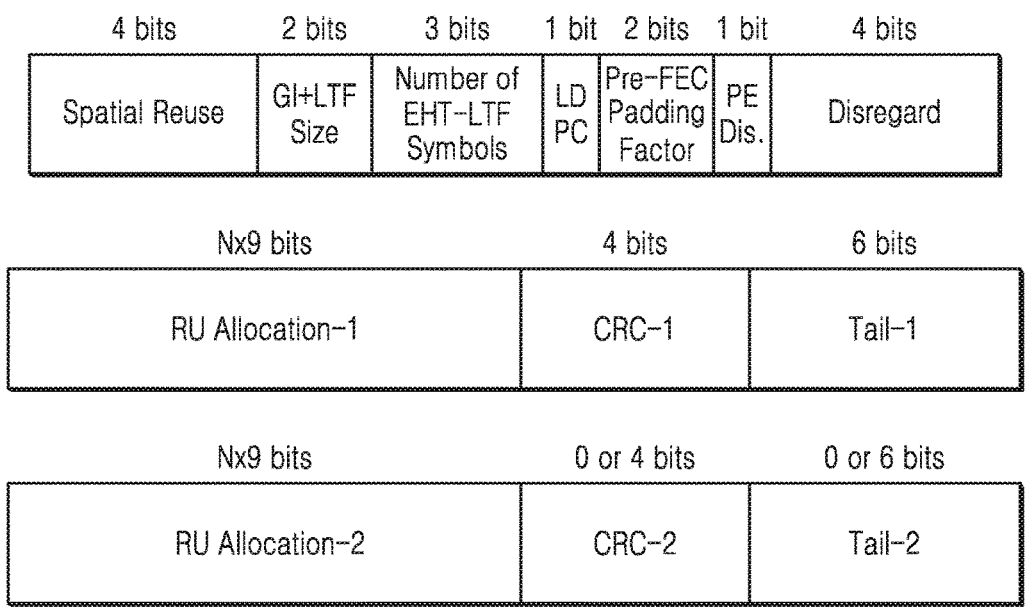

FIGS. 8A through 8C are diagrams of common fields according to embodiments. As described above with reference to FIG. 3, the common fields may be included in the EHT-SIG

FIELD

Referring to FIG. 8A, in an OFDMA transmission mode, a common field of the EHT-SIG field may include a 4-bit spatial reuse subfield, a 2-bit GI+LTF size subfield, a 3-bit number of EHT-LTF symbols subfield, a 1-bit LDPC extra symbol segment subfield, a 2-bit Pre-FEC padding factor subfield, a 1-bit PE disambiguity subfield, an N×9-bit RU allocation-1 subfield, a 4-bit CRC-1 subfield, a 6-bit tail-1 subfield, an M×9-bit RU allocation-2 subfield, a 0 or 4-bit CRC-2 subfield, and a 0 or 6-bit tail-2 subfield.

When a value of a BW field of the U-SIG field is 0 or 1, e.g., when a bandwidth is 20 MHz or 40 MHz, N may be 1 (N=1), and, when the value of the BW field is 2, 3, 4, or 5, e.g., when the bandwidth is 80 MHz, 160 MHz, or 320 MHz, N may be 2 (N=2). When the value of the BW field of the U-SIG field is 0, 1, or 2, e.g., when the bandwidth is 20 MHz, 40 MHz, or 80 MHz, M may be 0 (M=0), and the RU allocation-2 subfield may be omitted in the common field. When the value of the BW field is 3, e.g., when the bandwidth is 160 MHz, M may be 2 (M=2), and, when the value of the BW field is 4 or 5, e.g., when the bandwidth is 320 MHz, M may be 6 (M=6). When the RU allocation-2 subfield is omitted, the CRC-2 subfield and the tail-2 subfield may each have 0 bits and may be omitted in the common field.

Among the subfields included in the common field, the RU allocation subfield may indicate RU allocation information regarding a 20 MHz sub-channel (e.g., information regarding an RU type and the number of users supported). Accordingly, as the bandwidth increases, the number of RU allocation subfields in the common field may increase, and user fields, the number of which is the same as the number of users indicated by the RU allocation sub-fields, may be included in the user specific field of the content channel.

Referring to FIG. 8B, in a non-OFDMA transmission mode, a common field of the EHT-SIG field may include a 4-bit spatial reuse subfield, a 2-bit GI+LTF size subfield, a 3-bit number of EHT-LTF symbols subfield, a 1-bit LDPC extra-symbol segment subfield, a 2-bit Pre-FEC padding factor subfield, a 1-bit PE disambiguity subfield, and a 4-bit number of non-OFDMA users subfield. In the non-OFDMA transmission mode, the user specific field of the content channel may include user fields, the number of which is indicated by a value of the 4-bit number of non-OFDMA users subfield.

Referring to FIG. 8C, in the EHT sounding NDP mode, a common field of the EHT-SIG field may include the 4-bit spatial reuse subfield, the 2-bit GI+LTF size subfield, the 3-bit number of EHT-LTF symbols subfield, a 4-bit number of spatial streams (NSS) subfield, the 1-bit beamformed subfield, a 4-bit CRC subfield, and a 6-bit tail subfield. The value of the NSS subfield may indicate the number of spatial streams, for example, a maximum of eight spatial streams.

Figure 9B:
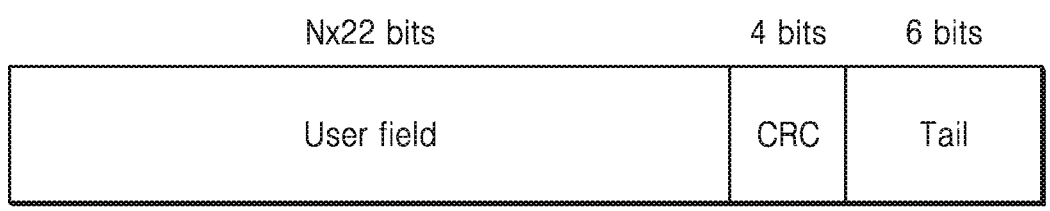

FIGS. 9A and 9B are diagrams of examples of a block including a user field, according to embodiments. FIG. 9A illustrates an encoding block including a common field and a user field, and FIG. 9B illustrates a user block field.

The user specific field may include 0 or at least one user block field and may have different features depending on modes. For example, in the OFMDA transmission mode, each non-final user block may include two user fields including information for two stations used to decode payloads. In the OFMDA transmission mode, a final user block field may include information for one user or two users which is dependent on the number of users in the EHT-SIG content channel, and the number of user fields may be presented by the RU allocation subfields. In the non-OFDMA transmission mode, the user block field may be configured in the same way as the OFDMA transmission by using other user fields than a first user field. In the non-OFDMA transmission mode, the first user field may configure an encoding block together with the common field, and the number of user fields may be presented in the number of non-OFDMA users subfield. The EHT sounding NDP may not include a user field.

Referring to FIG. 9A, the common field and the user field may be included in one encoding block. For example, as described above with reference to FIGS. 7D and 7E, in the PPDU for the DL non-OFDMA transmission to multiple users or the non-OFDMA transmission to a single user, the common field and the first user field may be included in one block (a "first encoding block"). As shown in FIG. 9A, the encoding block may include a 20-bit common field, a 22-bit user field, a 4-bit CRC field, and a 6-bit tail field.

Referring to FIG. 9B, the user block field may include an N×22-bit user field, a 4-bit CRC field, and a 6-bit tail field. In FIG. 9B, N may correspond to the number of user fields. For example, when only one user exists in the final user block field, N may be 1 (N=1), but in other cases, N may be 2.

FIGS. 10A and 10B are diagrams of examples of a user field according to embodiments. FIG. 10A illustrates a user field in non-MU-MIMO allocation, and FIG. 10B illustrates a user field in MU-MIMO allocation.

Referring to FIG. 10A, in the non-MU-MIMO allocation, the user field may have a 22-bit length. As shown in FIG. 10A, in the non-MU-MIMO allocation, the user field may include an 11-bit STA-ID subfield, a 4-bit MCS subfield, a 4-bit Number of Space-Time Streams (NSTS) subfield, a 1-bit beamformed subfield, and a 1-bit coding subfield.

Referring to FIG. 10B, in the MU-MIMO allocation, the user field may have a 22-bit length. As shown in FIG. 10B, in the MU-MIMO allocation, the user field may include an 11-bit STA-ID subfield, a 4-bit MCS subfield, a 1-bit coding subfield, and a 6-bit spatial configuration subfield.

Figure 11A:
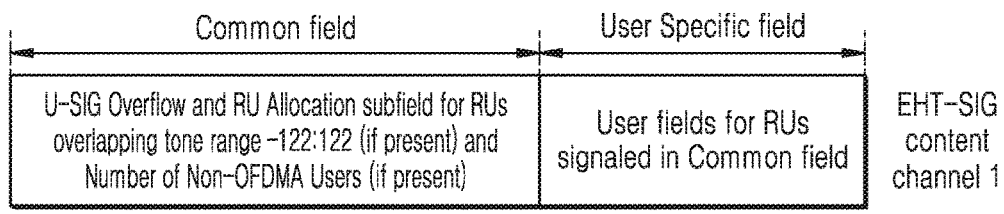
FIGS. 11A, 11B, 11C and 11D are diagrams of respective examples of an EHT-SIG content channel for transmission to multiple users, according to embodiments.
Figure 11B:
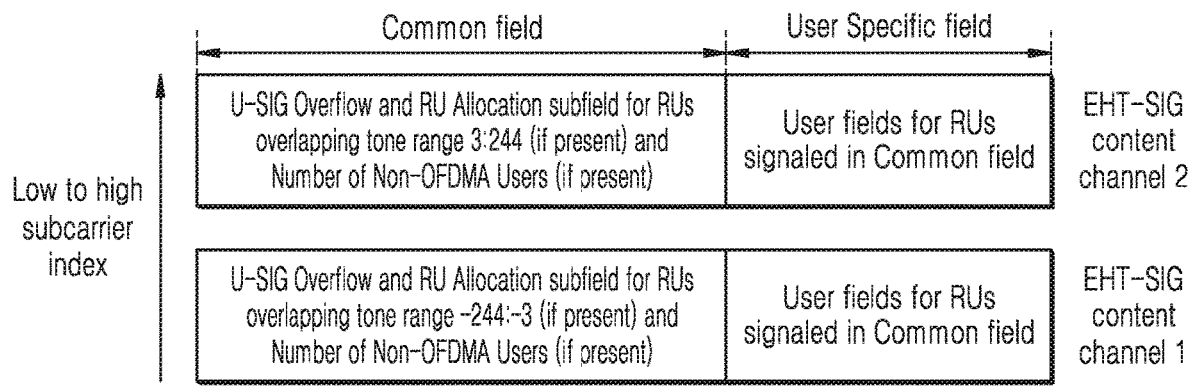
Figure 11C:
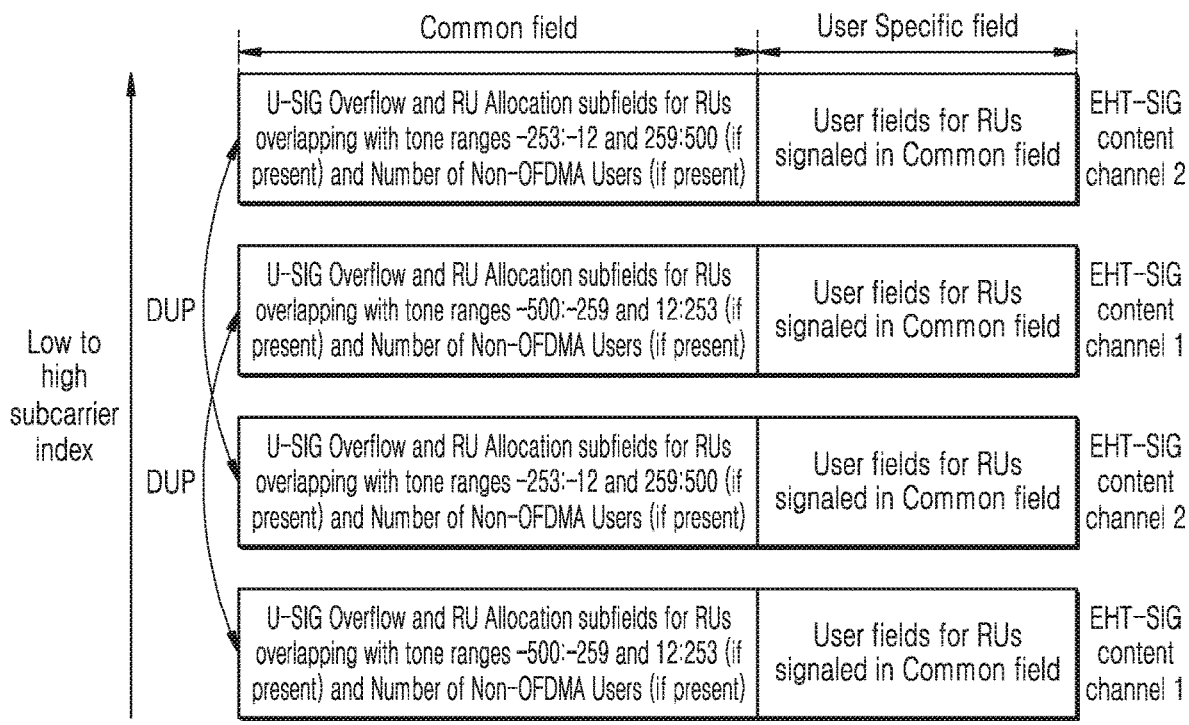
Figure 11D:
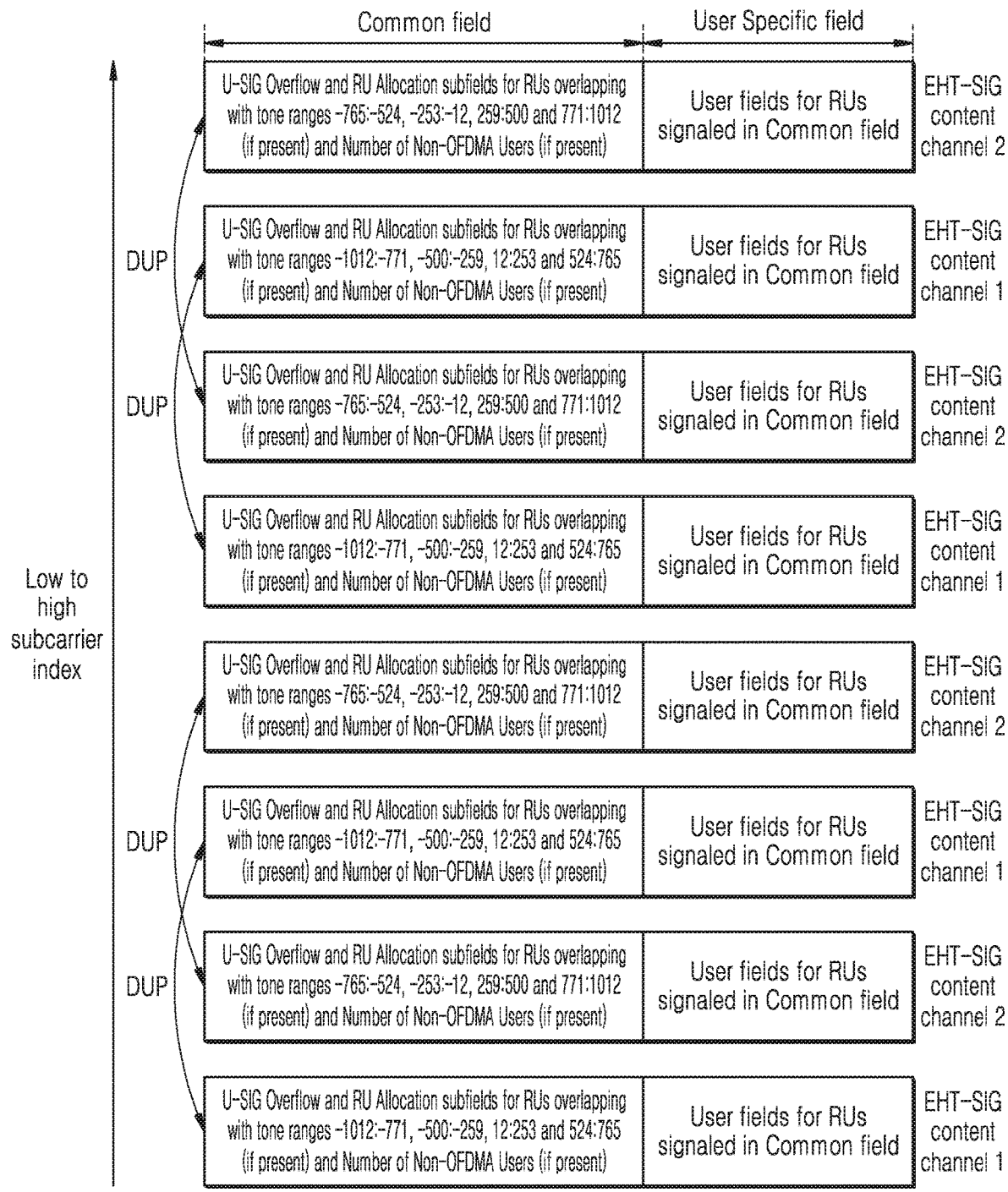

FIGS. 11A through 11D are diagrams of examples of an EHT-SIG content channel for transmission to multiple users, according to embodiments. FIG. 11A illustrates an EHT-SIG content channel for a 20 MHz PPDU for the OFDMA transmission and the non-OFDMA transmission to multiple users. FIG. 11B illustrates an EHT-SIG content channel for a 40 MHz PPDU for the OFDMA transmission and the non-OFDMA transmission to multiple users. FIG. 11C illustrates an EHT-SIG content channel for an 80 MHz PPDU for the OFDMA transmission and the non-OFDMA transmission to multiple users. FIG. 11D illustrates an EHT-SIG content channel for a 160 MHz PPDU for the OFDMA transmission and the non-OFDMA transmission to multiple users.

Referring to FIGS. 11A through 11D, in the OFDMA transmission mode or non-OFDMA transmission mode for multiple users, the EHT-SIG content channel may have a duplicated structure in a frequency axis. For example, in the OFDMA transmission mode, the EHT-SIG content channel may have different pieces of information in every 80 MHz frequency subblock. In the non-OFDMA transmission mode for multiple users, the EHT-SIG content channel may have different pieces of information in every 80 MHz frequency subblock.

Figure 12A:
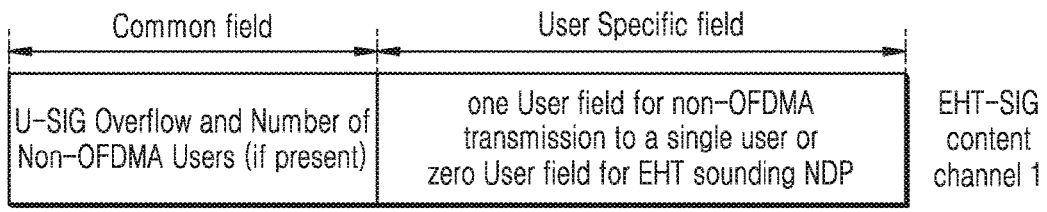
FIGS. 12A, 12B, 12C and 12D are diagrams of respective examples of an EHT-SIG content channel for transmission to a single user or a sounding null data packet (NDP), according to embodiments.
Figure 12B:
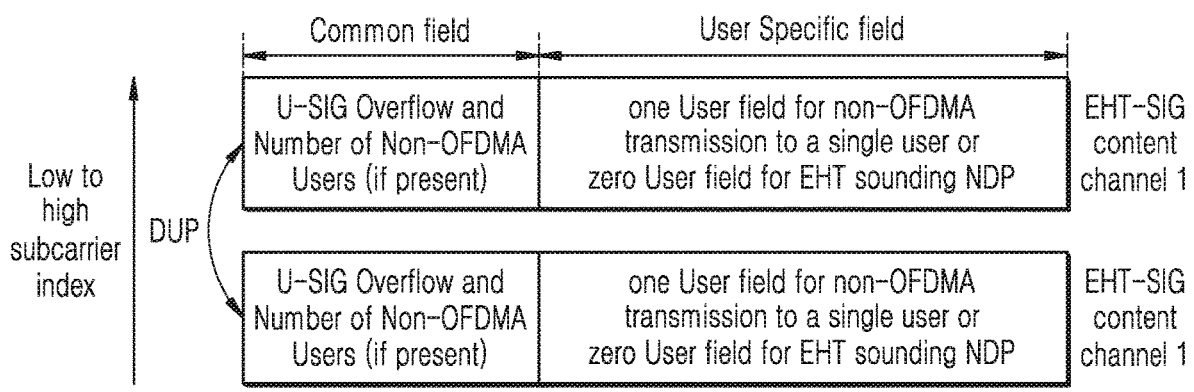
Figure 12C:
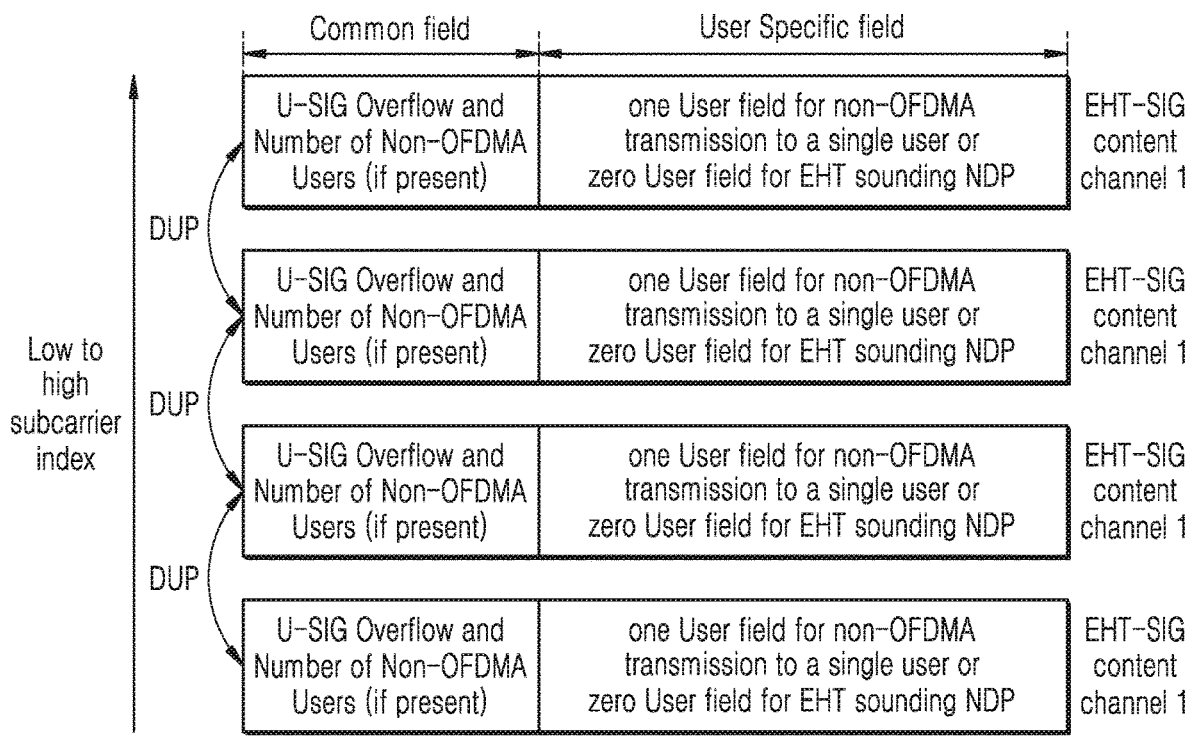
Figure 12D:
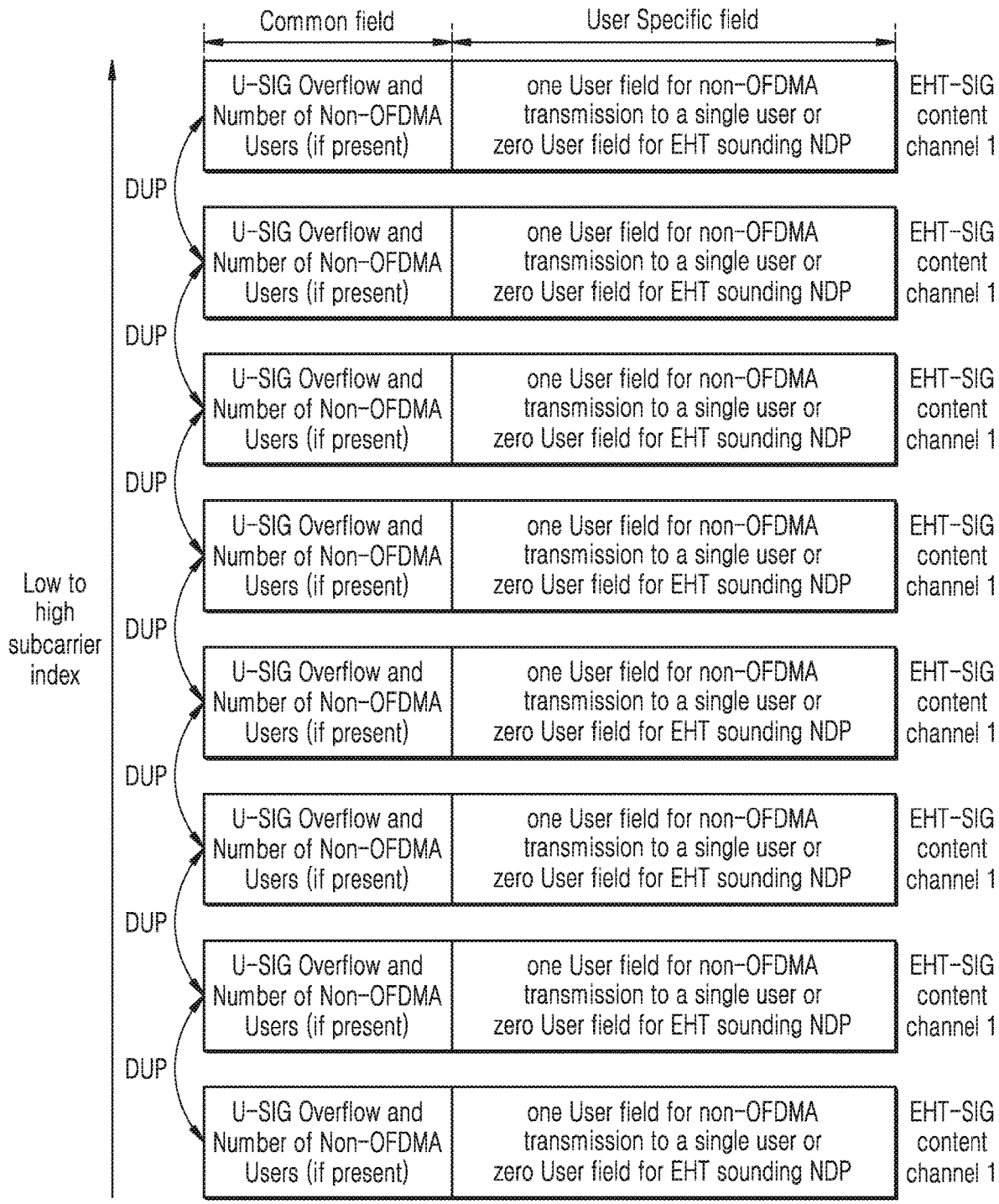

FIGS. 12A through 12D are diagrams of examples of an EHT-SIG content channel for transmission to a single user or a sounding NDP, according to embodiments. FIG. 12A illustrates an EHT-SIG content channel for a 20 MHz PPDU for the non-OFDMA transmission to a single user or the EHT sounding NDP. FIG. 12B illustrates an EHT-SIG content channel for a 40 MHz PPDU for the non-OFDMA transmission to a single user or the EHT sounding NDP. FIG. 12C illustrates an EHT-SIG content channel for a 80 MHz PPDU for the non-OFDMA transmission to a single user or the EHT sounding NDP. FIG. 12D illustrates an EHT-SIG content channel for a 160 MHz PPDU for the non-OFDMA transmission to a single user or the EHT sounding NDP.

Referring to FIGS. 12A through 12D, in the non-OFDMA transmission mode for a single user, the EHT-SIG content channel may have the same information in every 80 MHz frequency subblock. In the non-OFDMA transmission mode for a single user or an EHT sounding NDP mode, one EHT-SIG content channel may be duplicated in every 20 MHz frequency subblock, regardless of bandwidths.

Figure 13A:
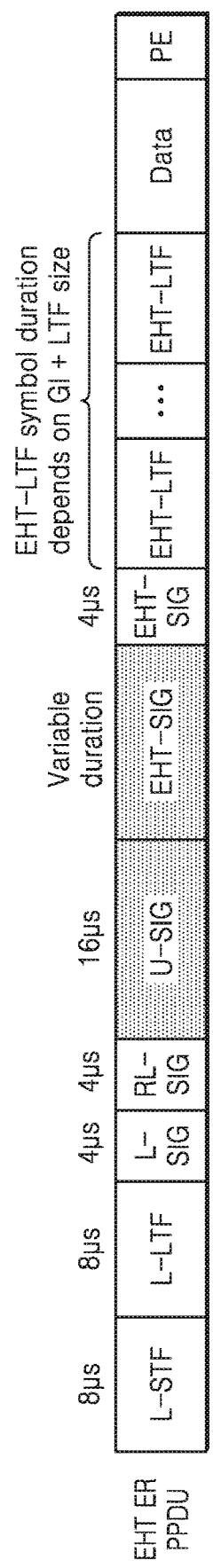
FIGS. 13A and 13B are diagrams of respective examples of a PPDU according to embodiments.
Figure 13B:
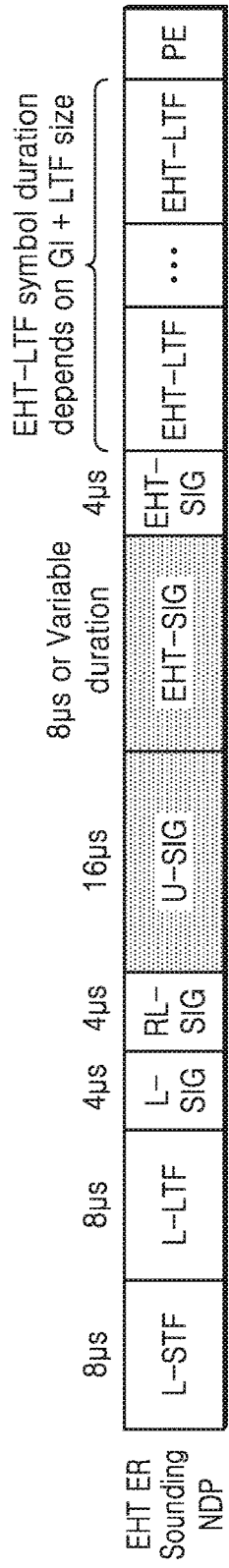

FIGS. 13A and 13B are diagrams of examples of a PPDU according to embodiments. FIG. 13A illustrates a structure of an EHT extended range (ER) PPDU, and FIG. 13B illustrates a structure of an EHT ER sounding NDP. EHT may support an ER for a transmitter and a receiver far away from each other. As described above with reference to FIG. 1, in the ER, the transmitter may transmit repeated patterns to the receiver, and the receiver may improve a reception rate by combining the repeated patterns with each other. Redundant descriptions between FIGS. 13A and 13B and descriptions of FIGS. 13A and 13B that are the same as given above with reference to FIG. 3 will be omitted.

Referring to FIG. 13A, the EHT ER PPDU may include an L-STF field, an L-LTF field, an L-SIG field, an RL-SIG field, a U-SIG field, an EHT-SIG field, an EHT-STF field, and a n EHT-LTF field in a preamble. The EHT ER PPDU may include a data field and a PE field in a payload. Compared with the EHT MU PPDU of FIG. 3, the U-SIG field and the EHT-SIG field in the EHT ER PPDU may be extended. In other words, the U-SIG field and the EHT-SIG field in the ER may each include repeated patterns. According to some embodiments, the EHT ER PPDU of FIG. 13A may be used in the DL MU OFDMA transmission mode, the DL MU non-OFDMA transmission mode, and the SU non-OFDMA transmission mode. Examples of the U-SIG field and the EHT-SIG field in the ER will be described below with reference to drawings.

Referring to FIG. 13B, the EHT ER sounding NDP may include an L-STF field, an L-LTF field, an L-SIG field, an RL-SIG field, a U-SIG field, an EHT-SIG field, an EHT-STF field, and a n EHT-LTF field in a preamble. The EHT ER sounding NDP may include a data field and a PE field in a payload. As shown in FIG. 13B, the data field may be omitted from the EHT ER sounding NDP, and, similar to the EHT ER PPDU of FIG. 13A, the EHT ER sounding NDP may include an extended U-SIG field and an extended EHT-SIG field. To estimate an extended range channel, the EHT ER sounding NDP of FIG. 13B may be used.

Figure 14:
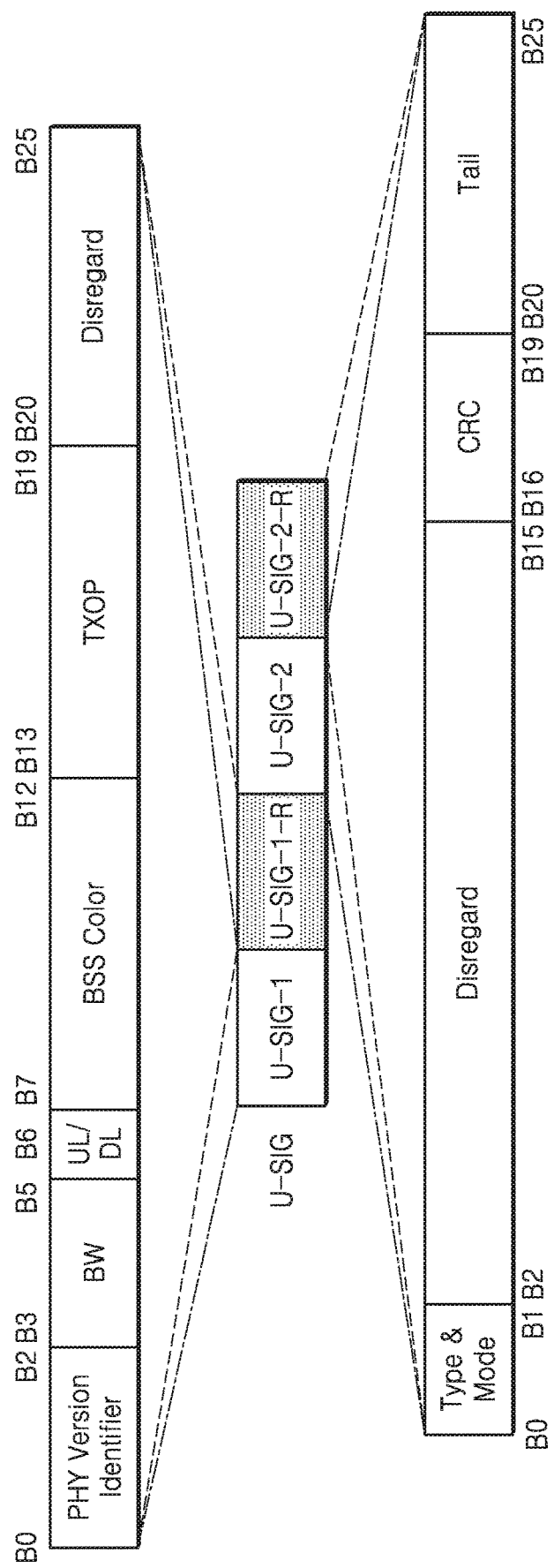
FIG. 14 is a diagram of a U-SIG field according to an embodiment.

FIG. 14 is a diagram of a U-SIG field according to an embodiment. FIG. 14 illustrates the U-SIG field included in the EHT ER PPDU, and, as described above with reference to FIG. 13A, the U-SIG field may be followed by the EHT-SIG field. Descriptions of FIG. 14 that are the same as given above with reference to FIG. 4 will be omitted.

As shown in FIG. 14, the U-SIG field may include U-SIG-1, U-SIG-1-R, U-SIG-2, and U-SIG-2-R. The U-SIG-1, the U-SIG-1-R, the U-SIG-2, and the U-SIG-2-R may correspond to four OFDM symbols, respectively, and may correspond to 26 bits, as shown in FIG. 14. The U-SIG-1 may include version-independent fields such as a 3-bit physical version identifier field, a 3-bit bandwidth field, a 1-bit UL/DL field, a 6-bit BSS color field, and a 7-bit TXOP field. Compared with the U-SIG-1 of FIG. 4, a valid bit may be omitted from the U-SIG-1 of FIG. 14. The U-SIG-2 may include version-dependent fields such as a 2-bit PPDU version and compression mode field, a 4-bit CRC field, and a 6-bit tail field. Compared with the U-SIG-2 of FIG. 4, a punctured channel information field, an EHT-SIG MCS field, and a number of EHT-SIG symbols field may be omitted from the U-SIG-2 of FIG. 14.

The U-SIG-1-R following the U-SIG-1 may include the same fields as the U-SIG-1, and the U-SIG-2-R following the U-SIG-2 may include the same fields as the U-SIG-2. In other words, the U-SIG in the ER may include repeated patterns, and accordingly may have an extended length (for example, 8 μs). As will be described later with reference to FIG. 18, the U-SIG-1 and the U-SIG-1-R may be modulated according to different modulation schemes, and the U-SIG-2 and the U-SIG-2-R may be modulated according to the same modulation schemes.

FIG. 15 is a table showing encoding of a PPDU type and compression mode field, according to an embodiment. The table of FIG. 15 shows a UL/DL field included in the U-SIG-1 of the U-SIG field of FIG. 14 together with the PPDU type and compression mode field included in the U-SIG-2 of the U-SIG field of FIG. 14. As described above with reference to FIG. 14, the UL/DL field may have a 1-bit length, and the PPDU type and compression mode field may have a 2-bit length.

For not only a single user but also multiple users in the DL, the ER may support transmission modes such as SU transmission, DL OFDMA transmission, and non-OFDMA MU-MIMO transmission. An ER sounding NDP mode may be required to measure a channel between an access point and a station far away from each other. According to some embodiments, the aforementioned modes in the ER may be defined in the table of FIG. 15.

Referring to FIG. 15, the UL/DL field may indicate a UL or a DL, and the PPDU type and compression mode field may indicate which mode the PPDU supports. As shown in FIG. 15, when the value of the PPDU type and compression mode field in the DL is 0, the PPDU may be for ER DL OFDMA. When the value of the PPDU type and compression mode field in the DL is 1, the PPDU may be for ER SU or ER NDP. When the value of the PPDU type and compression mode field in the DL is 2, the PPDU may be for ER DL MU-MIMO. When the value of the PPDU type and compression mode field in the UL is 1, the PPDU may be for ER SU or ER NDP.

Figure 16:
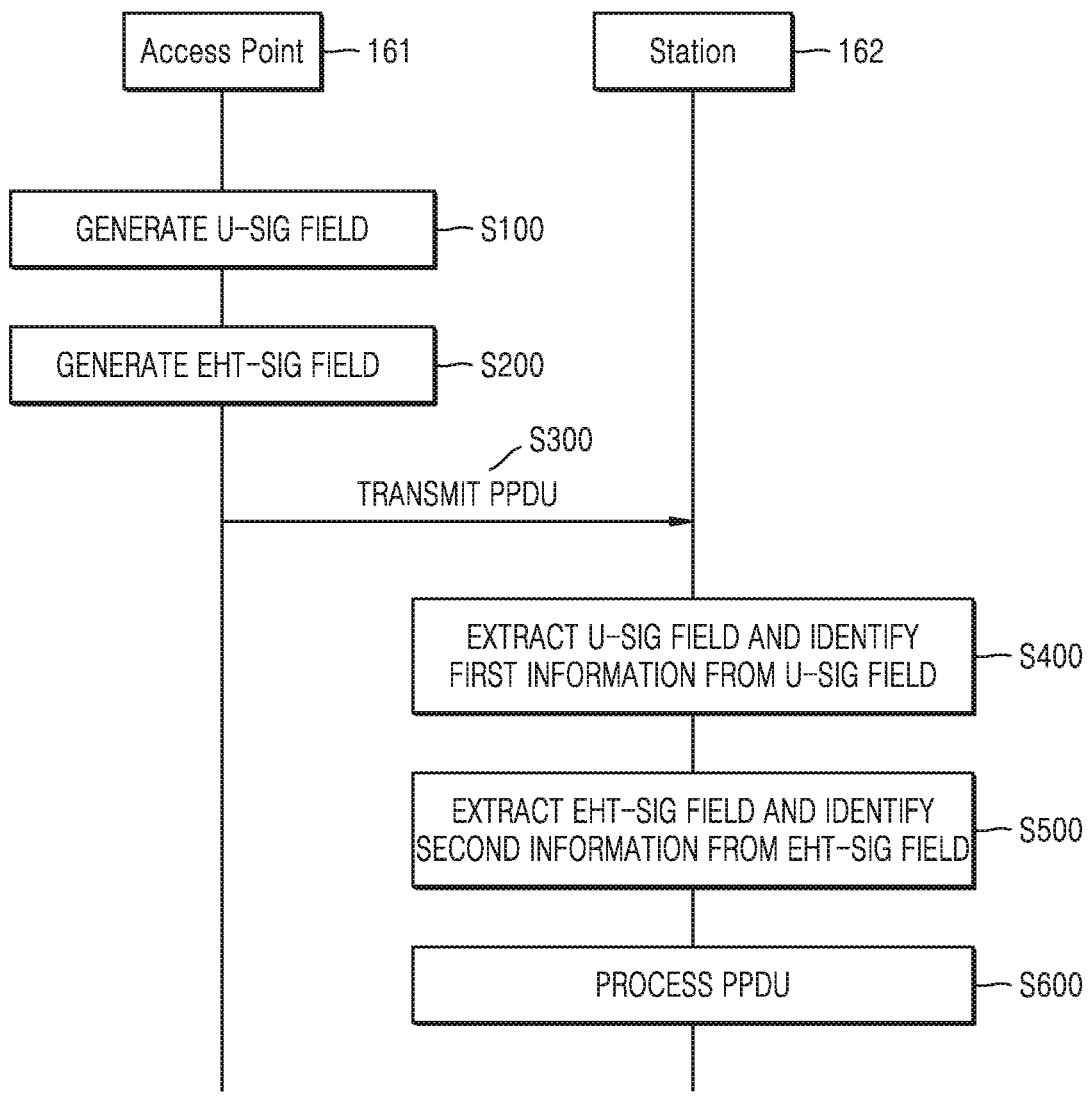
FIG. 16 is a process flow diagram illustrating a method for extended range transmission, according to an embodiment.

FIG. 16 is a process flow diagram illustrating a method for extended range transmission, according to an embodiment. As shown in FIG. 16, the method for extended range transmission may include a plurality of operations S100 through S600. It is assumed in FIG. 16 that an access point 161 and a station 162 communicate with each other in an ER.

Referring to FIG. 16, in operation S100, the access point 161 may generate a U-SIG field. As described above with reference to FIG. 14, in the ER, the access point 161 may generate a U-SIG field including repeated patterns and having an extended length. The U-SIG field may include information used to process a PPDU transmitted to the station 162 in operation S300, which will be described later. According to some embodiments, the U-SIG field may include information used by the station 162 to process an EHT-SIG field generated in operation S200, which will be described later. An example of operation S100 will be described later with reference to FIG. 17.

In operation S200, the access point 161 may generate the EHT-SIG field. As described above with reference to FIG. 14, in the ER, the access point 161 may generate a EHT-SIG field including repeated patterns and having an extended length. The EHT-SIG field may include information used to process the PPDU transmitted to the station 162 in operation S300, which will be described later. Examples of operation S200 will be described later with reference to FIGS. 19 and 22.

In operation S300, the access point 161 may transmit the PPDU, and the station 162 may receive the PPDU. For example, the PPDU may include the U-SIG field generated in operation S100 and the EHT-SIG field generated in operation S200. According to some embodiments, the PPDU transmitted in operation S300 may be the EHT ER PPDU described above with reference to FIG. 13A.

In operation S400, the station 162 may extract the U-SIG field from the PPDU and may identify first information from the U-SIG field. According to some embodiments, as will be described later with reference to FIG. 17, the station 162 may identify that the PPDU supports the ER, while extracting the U-SIG field. The first information included in the U-SIG field may include information to be used for processing the PPDU. For example, the first information may include information to be used for extracting and processing the EHT-SIG field following the U-SIG field. Examples of operation S400 will be described later with reference to FIGS. 17 and 28.

In operation S500, the station 162 may extract the EHT-SIG field from the PPDU and may identify second information from the EHT-SIG field. According to some embodiments, the station 162 may identify information about the repeated patterns from the EHT-SIG field, based on the first information identified in operation S400, and may extract the EHT-SIG field from the PPDU, based on the identified information. The second information included in the EHT-SIG field may include information to be used for processing the PPDU, together with the first information identified in operation S400. Examples of operation S500 will be described later with reference to FIGS. 19, 22, and 25.

In operation S600, the station 162 may process the PPDU. The station 162 may obtain necessary information by processing the PPDU, based on the first information identified in operation S400 and the second information identified in operation S500. For example, the station 162 may identify a user field allocated to the station 162, based on the first information and the second information, and may identify data provided by the access point 161 to the station 162 from the identified user field.

Figure 17:
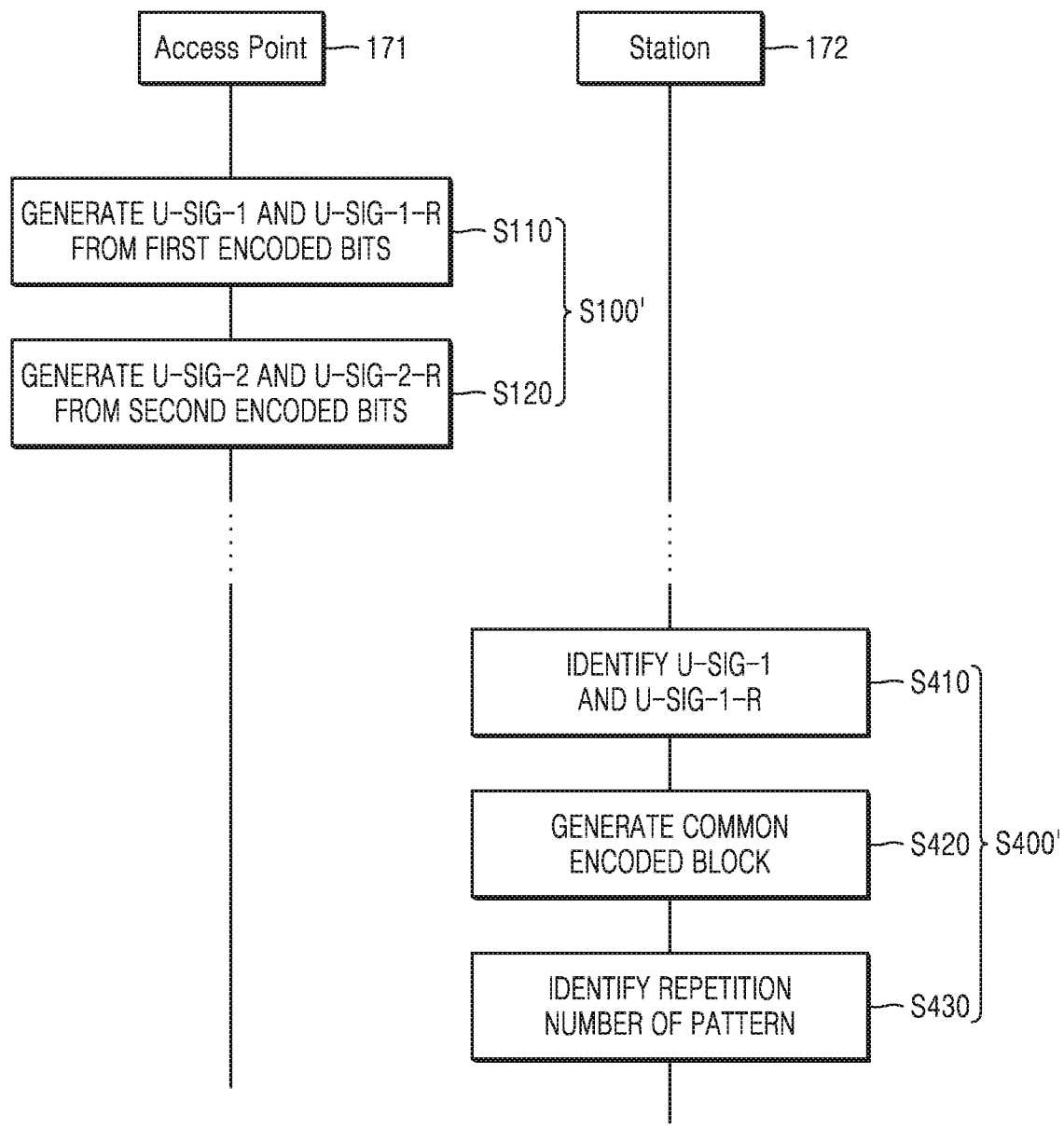
FIG. 17 is a process flow diagram illustrating a method for extended range transmission, according to an embodiment.
Figure 18:
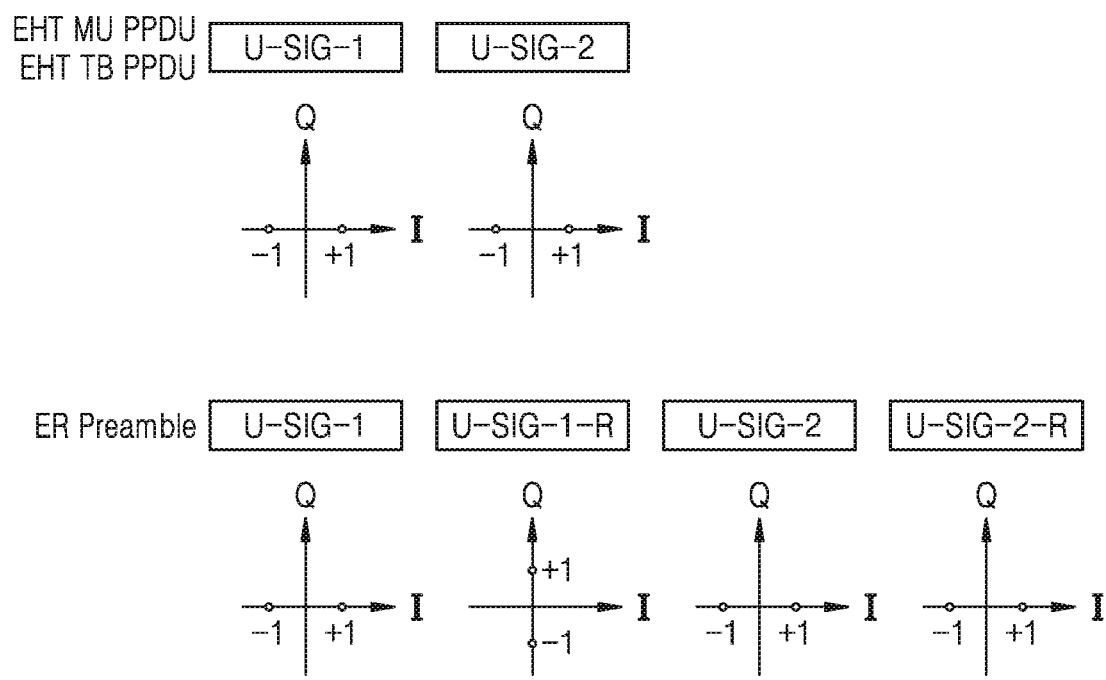
FIG. 18 is a diagram of a U-SIG field according to an embodiment.

FIG. 17 is a process flow diagram illustrating a method for extended range transmission, according to an embodiment, and FIG. 18 is a diagram illustrating a U-SIG field according to an embodiment. The flow diagram of FIG. 17 illustrates examples of operation S100 and operation S400, and an upper portion of FIG. 18 illustrates a U-SIG field included in an EHT MU PPDU or EHT TB PPDU and a lower portion of FIG. 18 illustrates an extended U-SIG field included in a PPDU in an ER, namely, an EHT ER PPDU or EHT ER sounding NDP. As described above with reference to FIG. 16, in operation S100' of FIG. 17, a U-SIG field may be generated, and, in operation S400' of FIG. 17, a U-SIG field may be extracted, and first information may be identified from the U-SIG field. FIGS. 17 and 18 will now be described with reference to FIG. 16.

Referring to FIG. 17, operation S100' may include operation S110 and operation S120. In operation S110, an access point 171 may generate U-SIG-1 and U-SIG-1-R from first encoded bits. As described above with reference to FIG. 14, the U-SIG-1 and the U-SIG-1-R, which are patterns repeated in the U-SIG field, may commonly correspond to fields including information. Accordingly, the access point 171 may generate the first encoded bits by encoding a bitstream including the values of fields corresponding to the U-SIG-1, based on, for example, forward error correction (FEC), and may generate the U-SIG-1 and the U-SIG-1-R from the first encoded bits.

Referring to the upper portion of FIG. 18, in the EHT MU PPDU or EHT TB PPDU, the access point 171 may generate the U-SIG-1 and the U-SIG-2 according to the same modulation schemes. For example, as shown in FIG. 18, the access point 171 may generate the U-SIG-1 and the U-SIG-2 from encoded bits, based on binary phase-shift keying (BPSK).

Referring to the lower portion of FIG. 18, in the ER, the access point 171 may generate the U-SIG-1 and the U-SIG-1-R according to different modulation schemes. For example, as shown in FIG. 18, the access point 171 may generate the U-SIG-1, based on BPSK, and may generate the U-SIG-1-R, based on quadrature binary phase shift keying (QBPSK). Accordingly, a station 172 may easily identify whether the PPDU including the U-SIG field has a format supporting the ER, according to a modulation scheme of a symbol (i.e., the U-SIG-2 or U-SIG-1-R) following the U-SIG-1.

Returning to FIG. 17, in operation S120, the access point 171 may generate U-SIG-2 and U-SIG-2-R from second encoded bits. As described above with reference to FIG. 14, the U-SIG-2 and the U-SIG-2-R, which are patterns repeated in the U-SIG field, may commonly correspond to fields including information. Accordingly, the access point 171 may generate the second encoded bits by encoding a bitstream including the values of fields corresponding to the U-SIG-2, based on, for example, FEC, and may generate the U-SIG-2 and the U-SIG-2-R from the second encoded bits.

Referring to the lower portion of FIG. 18, in the ER, the access point 171 may generate the U-SIG-2 and the U-SIG-2-R according to the same modulation scheme. For example, as shown in FIG. 18, the access point 171 may generate the U-SIG-2 and the U-SIG-2-R according to BPSK. As described above, the U-SIG-1-R modulated according to QBPSK may be used in order to indicate the EHT ER PPDU or the EHT ER sounding NDP, and the U-SIG-2-R may be modulated according to BPSK, similar to the U-SIG-2. As described above with reference to FIG. 14, the access point 171 may generate the U-SIG field sequentially including the U-SIG-1, the U-SIG-1-R, the U-SIG-2, and the U-SIG-2-R.

Returning to FIG. 17, operation 400' may include a plurality of operations S410 through S430. In operation S410, the station 172 may identify the U-SIG-1 and the U-SIG-1-R. As described above, the U-SIG-1-R may be modulated according to a different modulation scheme (for example, QBPSK) from the modulation scheme of the U-SIG-1 (for example, BPSK). When a modulation scheme of a symbol following the U-SIG-1 is different from the modulation scheme of the U-SIG-1, the station 172 may identify that the symbol following the U-SIG-1 is the U-SIG-1-R, and may identify the EHT ER PPDU or EHT ER sounding NDP including the extended U-SIG field.

In operation S420, the station 172 may generate a common encoded block. As described above, the U-SIG-1 and the U-SIG-1-R may commonly correspond to fields, and accordingly, the station 172 may generate a common encoded block by combining an encoded block derived from the U-SIG-1 with an encoded block derived from the U-SIG-1-R.

In operation S430, the station 172 may identify a repetition number of a pattern, which is a number of times that the pattern is repeated. For example, the station 172 may obtain information related to the repetition number of a pattern by decoding the common encoded block generated in operation S420, and may identify the repetition number of a pattern, based on the obtained information. According to some embodiments, as will be described later with reference to FIG. 27, the U-SIG field may include a field indicating the repetition number of a pattern. According to some embodiments, as will be described later with reference to FIG. 28, the U-SIG field may include a field implicitly indicating the repetition number of a pattern.

Figure 19:
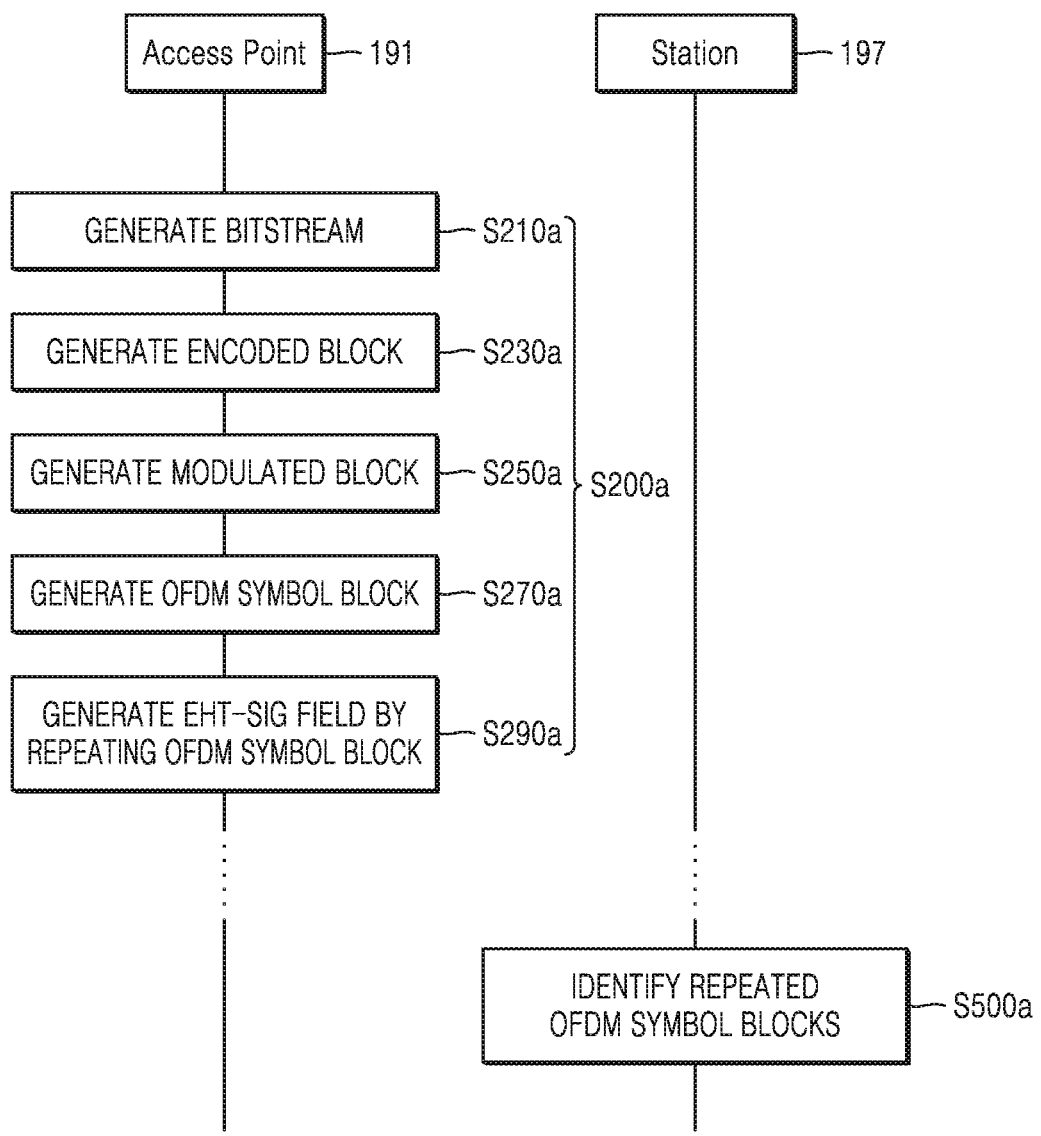
FIG. 19 is a process flow diagram illustrating a method for extended range transmission, according to an embodiment.
Figure 20A:
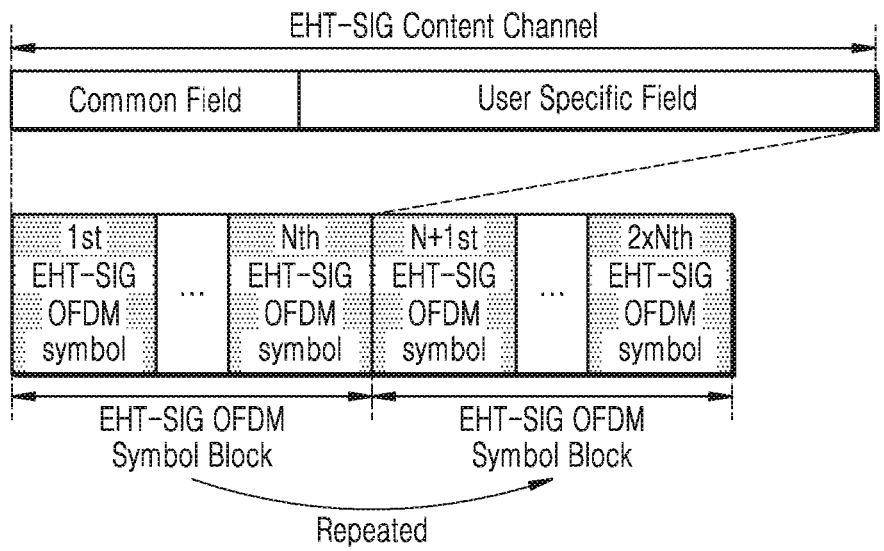
FIGS. 20A and 20B are diagrams of examples of an EHT-SIG content channel for extended range transmission, according to embodiments.
Figure 20B:
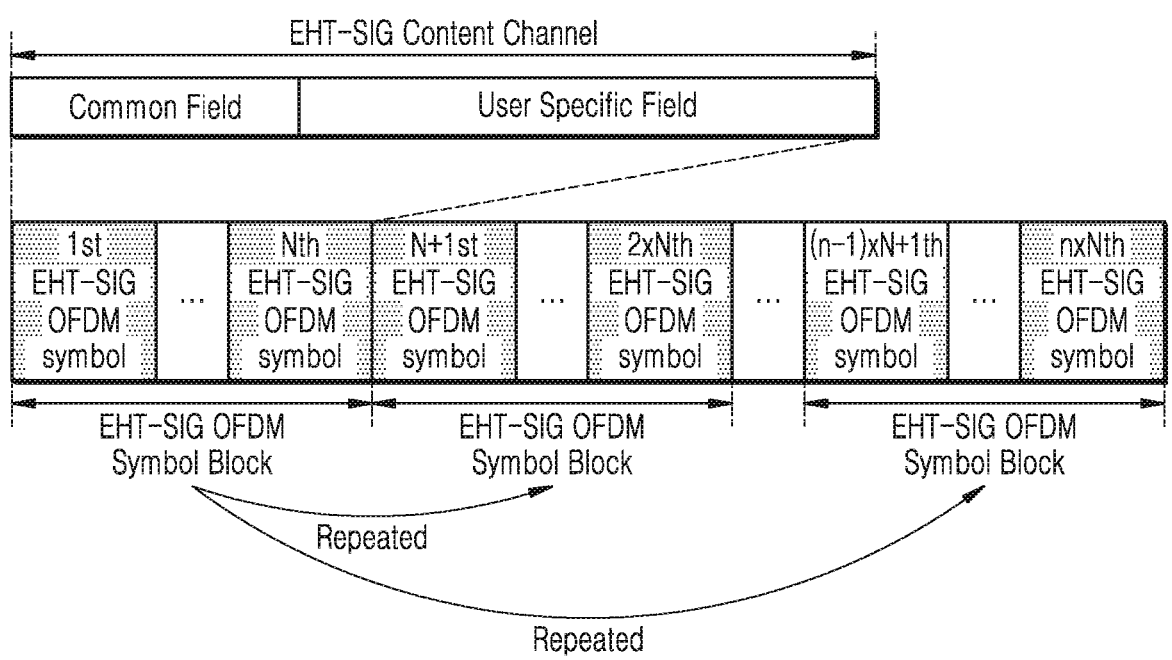

FIG. 19 is a process flow diagram illustrating a method for extended range transmission, according to an embodiment, and FIGS. 20A and 20B are diagrams illustrating examples of an EHT-SIG content channel for extended range transmission, according to embodiments. The flow diagram of FIG. 19 illustrates examples of operation S200 and operation S500 of FIG. 16, and FIGS. 20A and 20B illustrate examples of the EHT-SIG content channel used in FIG. 16. As described above with reference to FIG. 16, in operation S200a of FIG. 19, an EHT-SIG field may be generated, and, in operation S500a of FIG. 19, an EHT-SIG field may be extracted, and second information may be identified from the EHT-SIG field. FIGS. 19, 20A, and 20B will now be described with reference to FIG. 16.

Referring to FIG. 19, operation S200a may include a plurality of operations S210a, S230a, S250a, S270a, and S290a. In operation S210a, an access point 191 may generate a bitstream. For example, the access point 191 may generate a bitstream including the values of the EHT-SIG content channel. According to some embodiments, a structure of the EHT-SIG field of the EHT ER PPDU may be the same as or similar to that of an EHT-SIG field according to each transmission mode in the EHT MU PPDU. Overlapping of the EHT-SIG content channel according to bandwidths even in the EHT ER PPDU may be the same as or similar to that defined according to each transmission mode in the EHT MU PPDU. For example, the bitstream may include the values of a common field and a user field of the EHT-SIG field. The bitstream may include a series of bits, and each of the bits may have a valid meaning in a field (or subfield) to which each of the bits belongs. An example of operation S210a will be described later with reference to FIG. 21.

In operation S230a, the access point 191 may generate an encoded block from the bitstream. For example, the access point 191 may generate the encoded block by encoding the bitstream according to FEC. According to some embodiments, the access point 191 may generate the encoded block according to channel coding based on binary convolution coding (BCC) and/or low-density parity-check (LDPC). When BCC is used, a BCC interleaver may be applied to the encoded block.

In operation S250a, the access point 191 may generate a modulated block from the encoded block. For example, the access point 191 may generate the modulated block from the encoded block generated in operation S230a, by performing constellation mapping according to a predefined modulation scheme.

In operation S270a, the access point 191 may generate an OFDM symbol block from the modulated block. According to some embodiments, the access point 191 may sequentially map the modulated block generated in operation S250a with at least one OFDM symbol, and thus may generate an OFDM symbol block including the at least one OFDM symbol. For example, as shown in FIGS. 20A and 20B, the access point 191 may generate N OFDM symbols (where N is an integer greater than 0) from a modulated block generated from the EHT-SIG content channel including the common field and the user specific field. (Here, "modulated block" may refer to a digital modulation technique involving mapping of a constellation point of an I-Q graph to a complex value of a sub-carrier.) Herein, an OFDM symbol corresponding to the EHT-SIG field may be referred to as an EHT-SIG OFDM symbol, and an OFDM symbol block including the EHT-SIG OFDM symbol may be referred to as an EHT-SIG OFDM symbol block. It is noted that in the description herein involving OFDM technology, phrases such as "modulated block" and "OFDM symbol modulated from encoded bits" may refer to a digital modulation technique involving mapping of a constellation point of an I-Q graph to a complex value of a sub-carrier. Thus, the OFDM techniques discussed herein may involve two phases of modulation. The first modulation phase involves mapping each group of the encoded bits to an I-Q graph constellation point and in turn digitally modulating a subcarrier, in conjunction with an IFFT process with multiple values for subcarriers used as input data. This generates an OFDM symbol (in the form of a baseband waveform) that represents the encoded bits, and thus the OFDM symbol may be said to be "modulated from the encoded bits". The second modulation phase may involve modulating an RF carrier with the OFDM symbol and transmitting the modulated RF carrier.

Returning to FIG. 19, in operation S290a, the access point 191 may generate the EHT-SIG field by repeating the OFDM symbol block. According to some embodiments, as shown in FIG. 20A, the access point 191 may generate an EHT-SIG field (i.e., an extended EHT-SIG field) by repeating an EHT-SIG OFDM symbol block including N EHT-SIG OFDM symbols at least once. According to some embodiments, as shown in FIG. 20B, the access point 191 may generate an EHT-SIG field (i.e., an extended EHT-SIG field) by repeating the EHT-SIG OFDM symbol block including the N EHT-SIG OFDM symbols n times (where n is an integer greater than 1). In other words, in the examples of FIGS. 19, 20A, and 20B, a pattern repeated in the EHT-SIG field of the EHT ER PPDU may be the EHT-SIG OFDM symbol block.

Returning to FIG. 19, in operation S500a, a station 197 may identify the repeated OFDM symbol blocks. For example, the station 127 may receive the EHT ER PPDU including the extended EHT-SIG field from the access point 191, and may identify the repeated OFDM symbol blocks from the EHT-SIG field of the EHT ER PPDU (where "repeated symbol blocks" refers to the first symbol block in the EHT-SIG field and the one or more repetitions of the first symbol block in the EHT-SIG field). The station 197 may combine the repeated OFDM symbol blocks with each other and accordingly may improve a decoding success rate of information provided by the access point 191 through the EHT-SIG field. For instance, as mentioned earlier, one example of combining the repeated OFDM symbol blocks may be as follows: The first OFDM symbol block (at least one OFDM symbol) may represent an encoded block sequence, e.g., original bits that are encoded using redundant bits in an FEC encoding process. The one or more repetitions of the first OFDM symbol block may be concatenated with the first OFDM symbol block. The first and repetitive OFDM symbol blocks may be generated in the form of first and second baseband waveforms, respectively, and may be transmitted by modulating an RF carrier. The modulated RF carrier may be received at the receiver and demodulated to derive first and second received waveforms corresponding to the first and second baseband waveforms. The first and second received waveforms may be averaged, thereby generating an averaged waveform. When the averaged waveform is demodulated, de-mapped and decoded to generate corresponding bits, the encoded bits may be recovered with fewer errors than that achievable by processing the first waveform alone.

Figure 21:
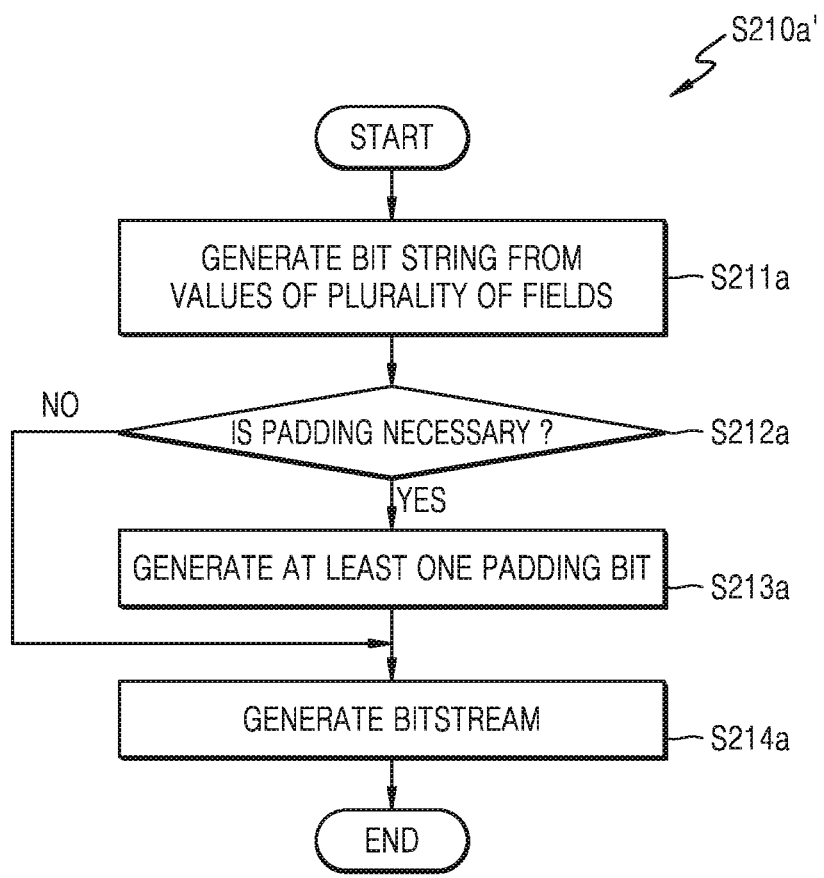
FIG. 21 is a flowchart of a method for extended range transmission, according to an embodiment.

FIG. 21 is a flowchart depicting an example operation, S210a', for operation S210a of FIG. 19 of generating a bitstream within the EHT-SIG field. As shown in FIG. 21, operation S210a' may include a plurality of operations S211a through S214a. FIG. 21 will now be described with reference to FIG. 19.

In operation S211a, a bit string may be generated to represent the values of a plurality of content fields. For example, the access point 191 may generate a bit string representing the values of the common field and the user field of the EHT-SIG field.

In operation S212a, a determination as to whether padding is desirable may be made. According to some embodiments, the access point 191 may determine whether padding is desirable, based on a length of the bit string generated in operation S211a and a length of the OFDM symbol. Here, "length of the ODFM symbol" refers to a number of bits represented by the OFDM symbol (the number of bits "corresponding to the OFDM symbol"). For example, the bit string may be represented by a single OFDM symbol or by a sequence of OFDM symbols. When the number of bits of the bit string generated in operation S211a does not correspond to an integer multiple of the number of bits corresponding to the OFDM symbol, the access point 191 may determine that padding is desirable. For example, when one EHT-SIG OFDM symbol corresponds to 56 bits and the length of the bit string is 80 bits, 32 padding bits may be needed (32=56*2-80). As shown in FIG. 21, when it is determined that padding is desirable, operation S213a may be subsequently performed, and, when it is determined that padding is unnecessary, operation S213a may not be performed.

When it is determined that padding is desirable, a number of padding bits may be determined (where the number is an integer that is zero when no padding bits are desired), and at least one padding bit equaling the number of padding bits may be generated (S213a). For example, the access point 191 may generate at least one padding bit to be added to the bit string generated in operation S211a, so that the number of bits of the bit string corresponds to an integer multiple of the number of bits corresponding to the OFDM symbol. According to some embodiments, the at least one padding bit may be referred to as a padding field.

In operation S214a, a bitstream may be generated, and the bitstream may include at least one padding bit generated as desired. For example, when it is determined in operation S212a that padding is unnecessary, the access point 191 may generate the bit string generated in operation S211a as the bitstream. On the other hand, when it is determined in operation S212a that padding is desired, the access point 191 may generate a bitstream including the bit string generated in operation S211a and the at least one padding bit generated in operation S213a. Accordingly, the number of bits of the bitstream may correspond to an integer multiple of the number of bits corresponding to the OFDM symbol.

Figure 22:
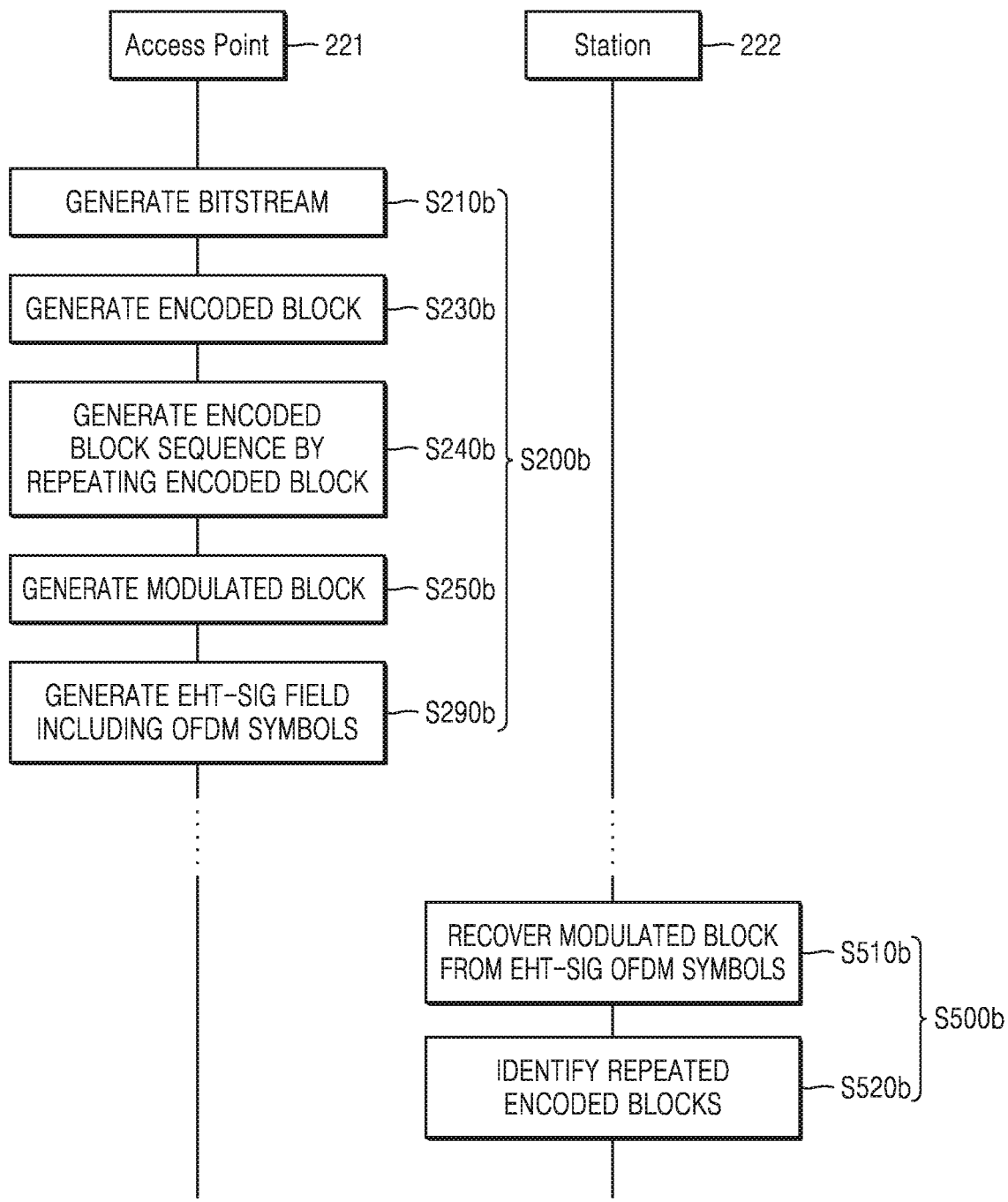
FIG. 22 is a process flow diagram illustrating a method for extended range transmission, according to an embodiment.

FIG. 22 is a process flow diagram illustrating a method for extended range transmission, according to an embodiment. In detail, the process flow diagram of FIG. 22 illustrates examples of operation S200 and operation S500 of FIG. 16. As described above with reference to FIG. 16, in operation S200b of FIG. 22, an EHT-SIG field may be generated, and, in operation S500b of FIG. 22, an EHT-SIG field may be extracted, and second information may be identified from the EHT-SIG field. As shown in FIG. 22, operation S200b may include a plurality of operations S210b, S230b, S240b, S250b, and S290b, and operation S500b may include operation S510b and operation S520b. FIG. 22 will now be described with reference to FIG. 16, and descriptions of FIG. 22 that are the same as given above with reference to FIG. 19 will be omitted.

Referring to FIG. 22, in operation S210b, an access point 221 may generate a bitstream, and in operation S230b, the access point 221 may generate an encoded block from the bitstream. In the example of FIG. 22, a padding bit may be omitted from the bitstream, and the encoded block may be generated from the bitstream from which the padding bit has been omitted.

In operation S240b, the access point 221 may generate an encoded block sequence by repeating the encoded block. Differently from the example of FIG. 19 in which the OFDM symbol block is repeated, in the example of FIG. 22, the encoded block may be repeated. In other words, in the examples of FIG. 22, a pattern repeated in the EHT-SIG field of the EHT ER PPDU may be the encoded block. According to some embodiments, at least one padding bit may be added to the repeated encoded blocks as desired, and thus generation of the encoded block from the bitstream from which the padding bit has been omitted may be compensated for. An example of operation S240b will be described later with reference to FIG. 23.

In operation S250b, the access point 221 may generate a modulated block from the encoded block sequence. In operation S290b, the access point 221 may generate an EHT-SIG field including OFDM symbols. Differently from the example of FIG. 19 in which a padding bit is generated in every OFDM symbol block, in the example of FIG. 22, a padding bit is added to the repeated encoded blocks. Thus, a length of the EHT-SIG field generated in FIG. 22 (or the number of OFDM symbols) may be equal to or less than a length of the EHT-SIG field generated in FIG. 19 (or the number of OFDM symbols).

In operation S510b, a station 222 may recover the modulated block from EHT-SIG OFDM symbols. For example, the station 222 may recover the modulated block from the EHT-SIG OFDM symbols included in the EHT-SIG field.

In operation S520b, the station 222 may identify repeated encoded blocks from the recovered modulated block. For example, the station 222 may generate an encoded block sequence by demodulating the modulated block recovered in operation S510b according to a predefined demodulation scheme (e.g., OFDM de-mapping), and may identify repeated encoded blocks included in the encoded block sequence. An example of operation S520b will be described later with reference to FIG. 23.

Figure 23:
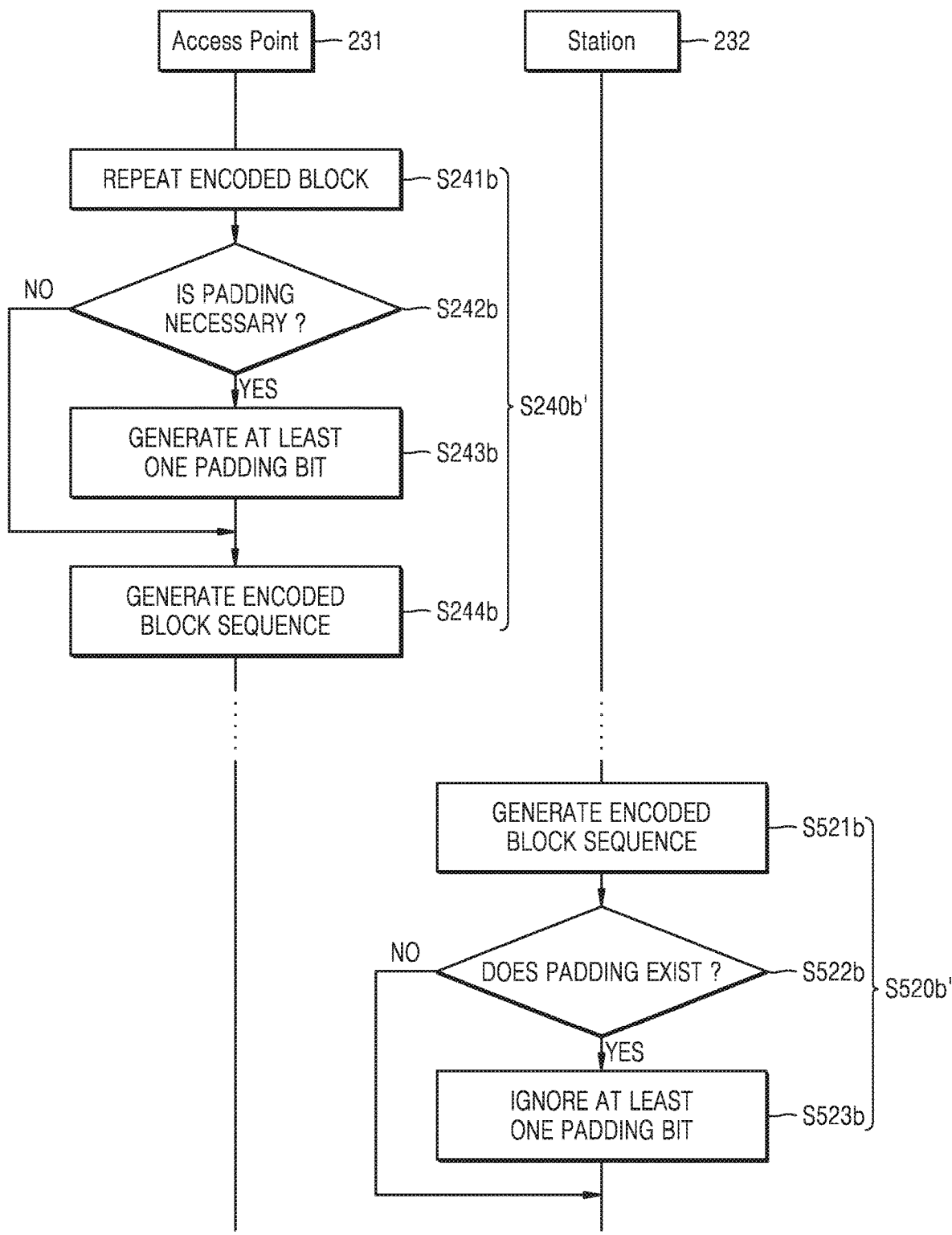
FIG. 23 is a process flow diagram illustrating a method for extended range transmission, according to an embodiment.
Figure 24:
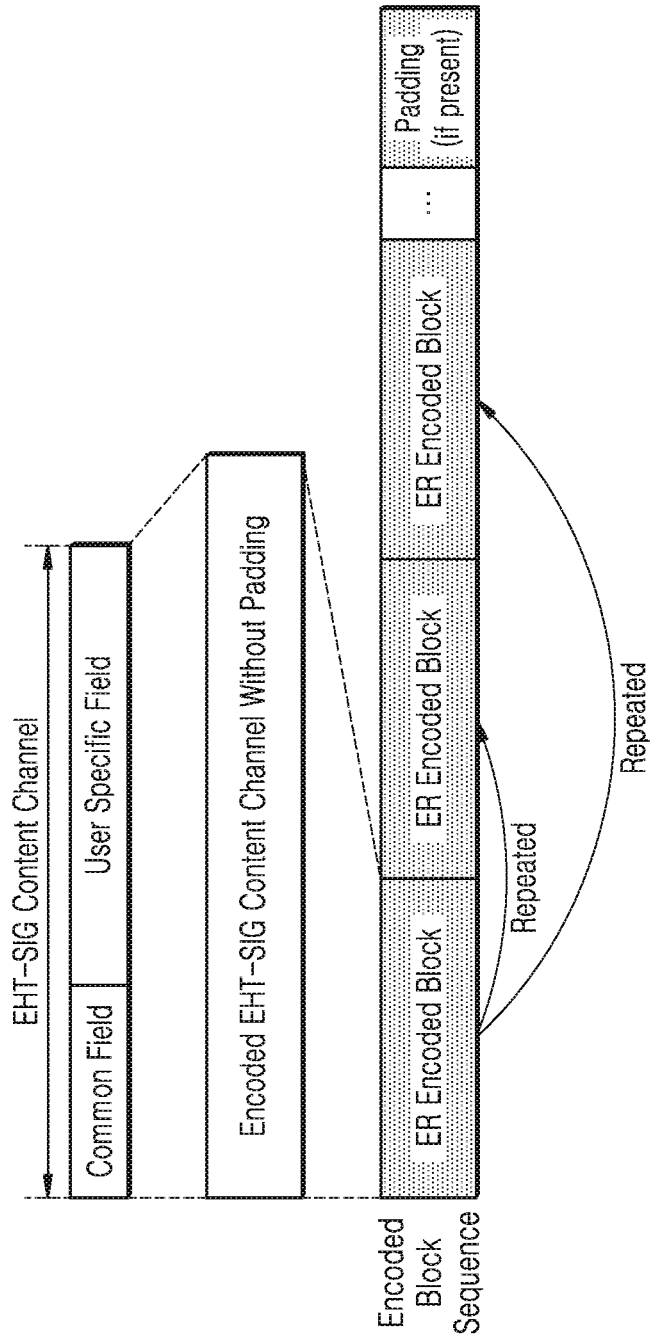
FIG. 24 is a diagram illustrating an encoded block sequence according to an embodiment.

FIG. 23 is a process flow diagram illustrating a method for extended range transmission, according to an embodiment, and FIG. 24 is a diagram illustrating an encoded block sequence according to an embodiment. In detail, the process flow diagram of FIG. 23 illustrates examples of operation S240b and operation S520b of FIG. 22, and FIG. 24 illustrates the encoded block sequence generated in operation S240b' of FIG. 23. As described above with reference to FIG. 22, in operation S240b' of FIG. 23, the encoded block sequence may be generated by repeating an encoded block, and, in operation S520b' of FIG. 23, repeated encoded blocks may be identified. As shown in FIG. 23, operation S240b' may include a plurality of operations S241b through S244b, and operation S520b' may include a plurality of operations S521b through S523b. FIGS. 23 and 24 will now be described with reference to FIG. 22.

Referring to FIG. 23, in operation S241b, the encoded block may be repeated. For example, an access point 231 may repeat the encoded block generated in operation S230b of FIG. 22 at least two times. As described above with reference to FIG. 22, the encoded block may be generated from the bitstream from which the padding bit has been omitted. Referring to FIG. 24, an EHT-SIG content channel may include a common field and a user specific field, and an encoded block, namely, an encoded EHT-SIG content channel, may be generated by encoding the EHT-SIG content channel according to FEC. As shown in FIG. 24, padding may be omitted from the encoded EHT-SIG content channel, and the encoded block (or an ER encoded block) may be repeated.

Returning to FIG. 23, in operation S242b, a determination as to whether padding is desirable may be made. According to some embodiments, the access point 231 may determine whether padding is desirable, based on a length of the repeated encoded blocks generated in operation S241b and a length of the OFDM symbol. For example, when the total number of bits of the repeated encoded blocks generated in operation S241b does not correspond to an integer multiple of the number of bits corresponding to the OFDM symbol, the access point 231 may determine that padding is desirable. As shown in FIG. 23, when it is determined that padding is desirable, operation S243b may be subsequently performed, and, when it is determined that padding is unnecessary, operation S243b may not be performed.

When it is determined that padding is desirable, the access point 231 may generate at least one padding bit, in operation S243b. For example, the access point 231 may generate at least one bit, namely, at least one padding bit, to be added to the repeated encoded blocks generated in operation S241b, so that the total number of bits of the repeated encoded blocks corresponds to an integer multiple of the number of bits corresponding to the OFDM symbol.

In operation S244b, the access point 231 may generate the encoded block sequence, and the encoded block sequence may include the at least one padding bit generated as desirable. For example, when it is determined in operation S242b that padding is-unnecessary, the access point 231 may generate the repeated encoded blocks generated in operation S241b as the encoded block sequence. On the other hand, when it is determined in operation S242b that padding is desirable, the access point 231 may generate an encoded block sequence including the repeated encoded blocks generated in operation S241b and the at least one padding bit generated in operation S243b. Accordingly, as shown in FIG. 24, the encoded block sequence may be generated. According to some embodiments, when the encoded block is encoded according to BCC, the access point 231 may apply a BBC interleaver to bits to which a padding bit has been selectively added, and may generate an encoded block sequence to which the BBC interleaver has been applied.

In operation S521b, a station 232 may generate an encoded block sequence. For example, the station 232 may generate the encoded block sequence by demodulating a modulated block according to a predefined modulation scheme.

In operation S522b, the station 232 may determine whether padding exists. As described above, when the total number of bits of the repeated encoded blocks does not correspond to an integer multiple of the number of bits corresponding to the OFDM symbol, the station 232 may determine that padding exists in the encoded block sequence. As shown in FIG. 23, when padding exists in the encoded block sequence, operation S523b may be performed, and, when no padding exists in the encoded block sequence, operation S523b may not be performed.

In operation S523b, the station 232 may ignore at least one padding bit in the encoded block sequence. For example, the station 232 may ignore at least one padding bit in the encoded block sequence, and may identify the repeated encoded blocks from a portion of the encoded block sequence from which the at least one padding bit has been omitted.

Figure 25:
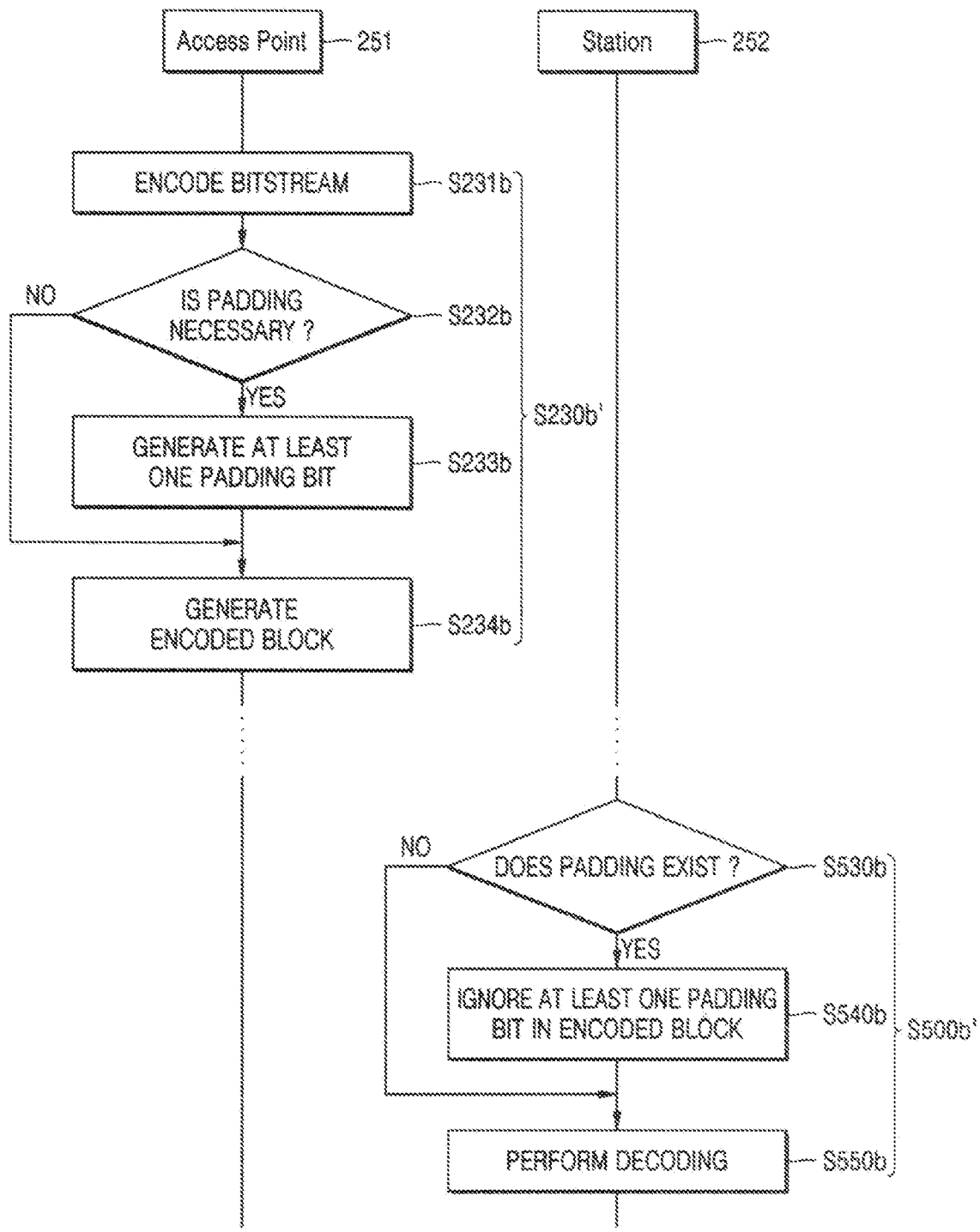
FIG. 25 is a process flow diagram illustrating a method for extended range transmission, according to an embodiment.
Figure 26:
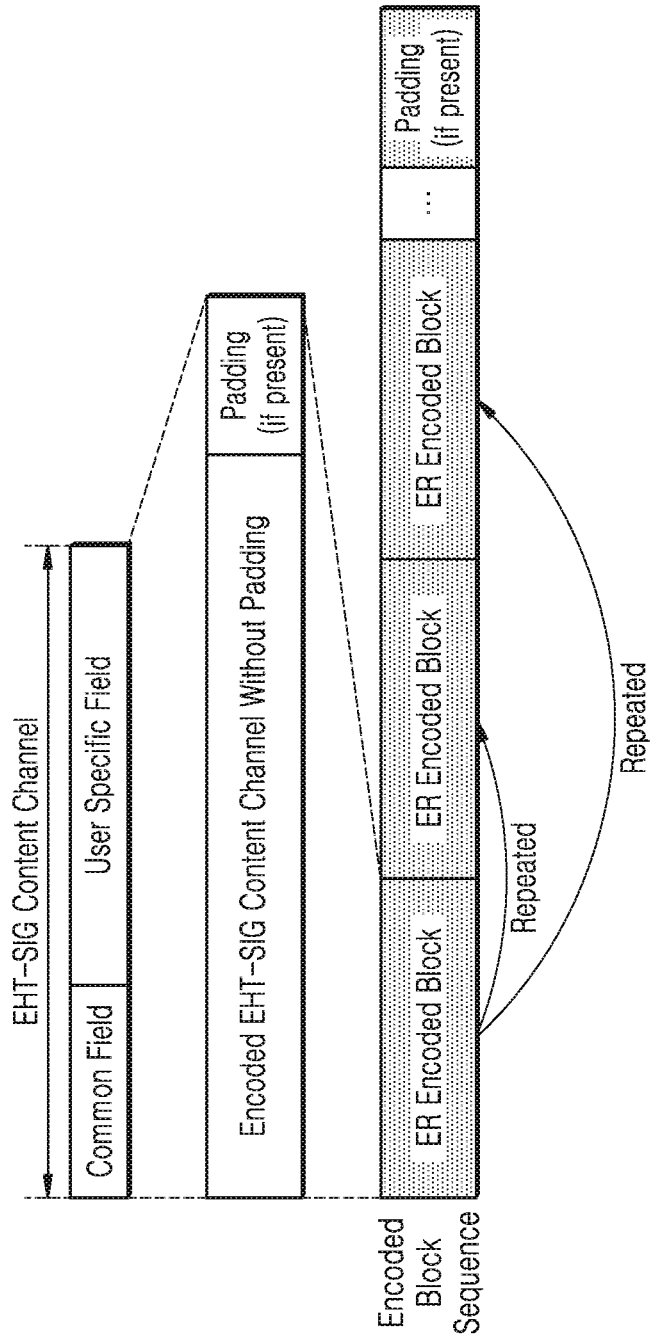
FIG. 26 is a diagram illustrating an encoded block sequence according to an embodiment.

FIG. 25 is a process flow diagram illustrating a method for extended range transmission, according to an embodiment, and FIG. 26 is a diagram illustrating an encoded block sequence according to an embodiment. In detail, the process flow diagram of FIG. 25 illustrates examples of operation S230b of FIG. 22 and operation S500 of FIG. 16, and FIG. 26 illustrates the encoded block sequence generated in operation S240b' of FIG. 25. As described above with reference to FIG. 22, in operation S230b' of FIG. 25, an encoded block may be generated. As described above with reference to FIG. 16, in operation S500b' of FIG. 25, an EHT-SIG field may be extracted, and second information may be identified from the EHT-SIG field. As shown in FIG. 25, operation S230b' may include a plurality of operations S231b through S234b, and operation S500b' may include a plurality of operations S530b, S540b, and S550b.

Referring to FIG. 25, in operation S231b, an access point 251 may encode a bitstream. For example, the access point 251 may encode the bitstream according to channel coding such as BCC or LDPC. Referring to FIG. 26, an EHT-SIG content channel may include a common field and a user specific field, and an encoded EHT-SIG content channel may be generated by encoding the EHT-SIG content channel according to FEC. As shown in FIG. 26, the EHT-SIG content channel (i.e., a bitstream) and the encoded EHT-SIG content channel may include no padding bits.

In operation S232b, the access point 251 may determine whether padding is desirable. According to some embodiments, the access point 251 may determine whether padding is desirable, based on a length of the bitstream encoded in operation S231b and a length of a modulated symbol. For example, when the number of bits of the encoded bitstream is not an integer multiple of the number of bits that a constellation point according to a modulation scheme has, the access point 251 may determine that padding is desirable. For example, when 16-quadrature amplitude modulation (16-QAM) is used as the modulation scheme, one constellation point may have four bits, and, when the encoded bitstream is composed of 37 bits, three padding bits may be required. As shown in FIG. 25, when it is determined that padding is desirable, operation S233b may be subsequently performed, and, when it is determined that padding is unnecessary, operation S233b may not be performed.

When it is determined that padding is desirable, the access point 251 may generate at least one padding bit, in operation S233b. For example, the access point 251 may generate at least one bit, namely, at least one padding bit, to be added to the encoded bitstream generated in operation S231b, so that the number of bits of the encoded bitstream corresponds to an integer multiple of the number of bits corresponding to the modulated symbol.

In operation S234b, the access point 251 may generate an encoded block, and the encoded block may include the at least one padding bit generated as desired. For example, when it is determined in operation S232b that padding is unnecessary, the access point 251 may generate the encoded bitstream generated in operation S231b as the encoded block, and the encoded block may be repeated. On the other hand, when it is determined in operation S232b that padding is desirable, the access point 251 may generate an encoded block sequence including the encoded bitstream generated in operation S231b and the at least one padding bit generated in operation S233b. Accordingly, as shown in FIG. 26, an encoded EHT-SIG content channel and an encoded block (or an ER encoded block) including a padding bit may be generated. As shown in FIG. 26, the encoded block may be repeated, a padding bit may be added to the repeated encoded blocks as desired, and the encoded block sequence may be generated.

In operation S530b, a station 252 may determine whether padding exists. For example, the station 252 may identify the repeated encoded blocks from the encoded block sequence, and may determine whether padding exists in the identified repeated encoded blocks. When the number of bits of the encoded bitstream is not an integer multiple of the number of bits corresponding to the modulated symbol, the station 252 may determine that padding exists in the encoded block. As shown in FIG. 25, when padding exists in the encoded block, operation S540b may be performed, and, when no padding exists in the encoded block, operation S540b may not be performed.

In operation S540b, the station 252 may ignore at least one padding bit in the encoded block. For example, the station 252 may ignore at least one padding bit in the encoded block, and may identify the encoded bits (or the encoded bitstream) from a portion of the encoded block from which the at least one padding bit has been omitted.

In operation S550b, the station 252 may perform decoding. For example, the station 252 may decode the encoded bits (or the encoded bitstream) according to channel coding such as BCC or LPPC, and thus decoded bits (or a bitstream) may be generated.

Figure 27:
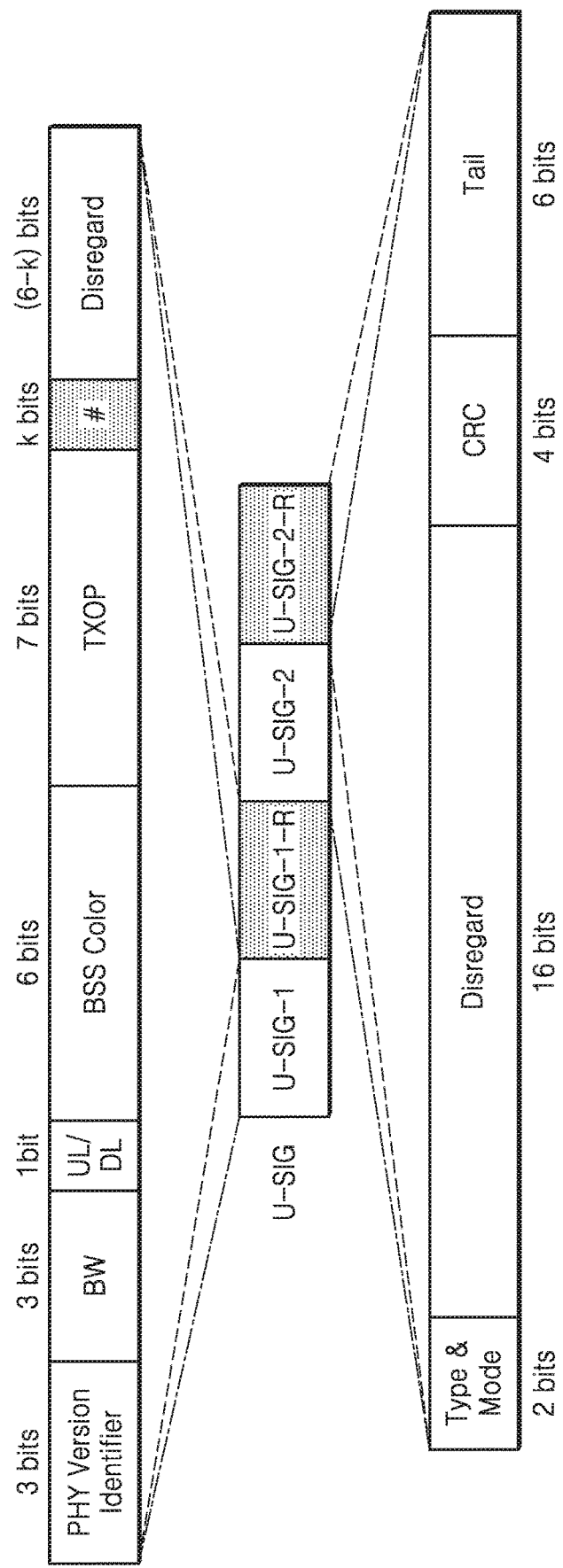
FIG. 27 is a diagram of a U-SIG field according to an embodiment.

FIG. 27 is a diagram of a U-SIG field according to an embodiment. In detail, FIG. 27 illustrates a U-SIG field included in the EHT ER PPDU. Descriptions of fields within FIG. 27 that are the same as given above with reference to FIG. 14 will be omitted.

Referring to FIG. 27, the U-SIG field may include U-SIG-1, U-SIG-1-R, U-SIG-2, and U-SIG-2-R. The U-SIG-1 and the U-SIG-1-R may include version-independent fields such as a 3-bit physical version identifier field, a 3-bit bandwidth field, a 1-bit UL/DL field, a 6-bit BSS color field, a 7-bit TXOP field, and a k-bit pattern repetition number field (#) (where k is an integer greater than 0). Compared with the U-SIG-1 and the U-SIG-1-R of FIG. 14, the U-SIG-1 and the U-SIG-1-R of FIG. 27 may further include the k-bit pattern repetition number field (#).U-SIG-2 and U-SIG-2-R, which are version-dependent fields, may each include a 2-bit PPDU version and compression mode field, a 4-bit CRC field, and a 6-bit tail field.

The pattern repetition number field ("#") may indicate the number of repetitions of a pattern in the EHT-SIG field or the total number of instances of the pattern within the EHT-SIG field (i.e., the number of repetitions plus one). According to some embodiments, the pattern repetition number field (#) may indicate the number of repetitions of an OFDM symbol block in the EHT-SIG field, as described above with reference to FIGS. 19 through 21. Accordingly, the pattern repetition number field (#) included in the U-SIG-1, which is a field indicating the number of EHT-OFDM symbol blocks, may be defined as in [Table 1] below.

TABLE 1

| Field | Number of bits | Description |
|---|---|---|
| Number Of EHT-SIG OFDM symbol blocks | k | Indicates the number of repetitions of an EHT-SIG OFDM symbol block in EHT-SIG field |

According to some embodiments, the pattern repetition number field (#) may indicate the number of repetitions of an encoded block in the EHT-SIG field, as described above with reference to FIGS. 22 through 26. Accordingly, the pattern repetition number field (#) included in the U-SIG-1, which is a field indicating the number of ER encoded blocks, may be defined as in [Table 2] below.

TABLE 2

| Field | Number of bits | Description |
|---|---|---|
| Number Of ER Encoded Blocks | k | Indicates the number of repetitions of ER encoded block in EHT-SIG content channel |

An AP may generate the U-SIG field including the pattern repetition number field (#) indicating the number of repetitions of a pattern (for example, an OFDM symbol block or an encoded block) or a total number of instances of the pattern within the EHT-SIG content channel, and a station may extract the pattern repetition number field (#) from the U-SIG field. The station may identify the number of repetitions of a pattern (for example, an OFDM symbol block or an encoded block), based on the value of the pattern repetition number field (#). The station may identify the repeated pattern (for example, an OFDM symbol block or an encoded block), based on the identified repetition number, and may improve a decoding success rate by combining the repeated patterns with each other.

Figure 28:
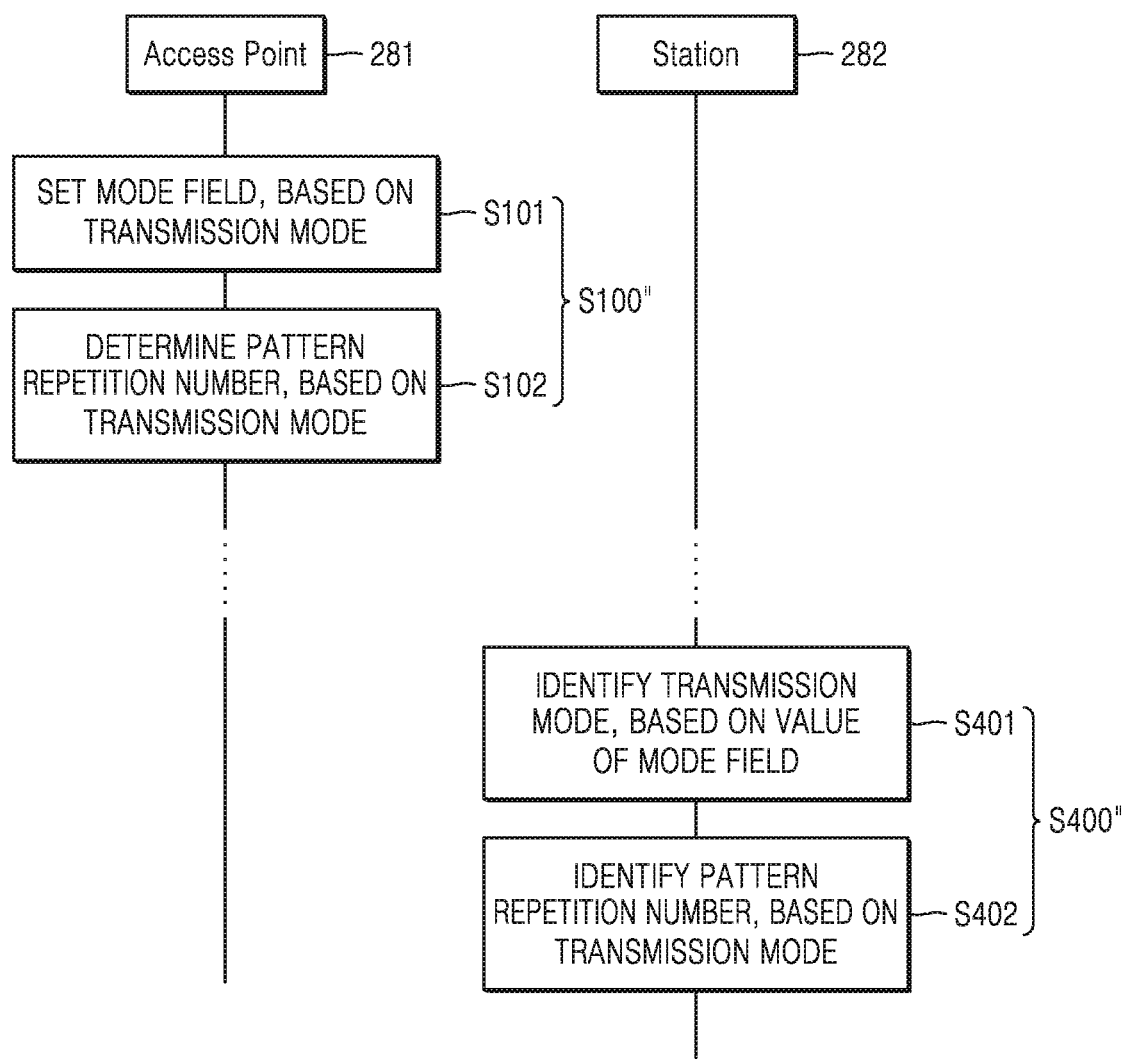
FIG. 28 is a process flow diagram illustrating a method for extended range transmission, according to an embodiment.

FIG. 28 is a process flow diagram illustrating a method for extended range transmission, according to an embodiment. In detail, the process flow diagram of FIG. 28 illustrates a method of indicating a pattern repetition number in extended range transmission. According to some embodiments, operation S100" of FIG. 28 may be an example of operation S100 of FIG. 16, and operation S400" of FIG. 28 may be an example of operation S400 of FIG. 28. As shown in FIG. 28, operation S100" may include operation S101 and operation S102, and operation S400" may include operation S401 and operation S402.

Referring to FIG. 28, in operation S101, an access point 281 may set a mode field, based on a transmission mode. As described above with reference to FIG. 14, the U-SIG-2 and the U-SIG-2-R may include a PPDU type and compression mode field, and the access point 281 may set the PPDU type and compression mode field according to a transmission mode with reference to the table of FIG. 15.

In operation S102, the access point 281 may determine a pattern repetition number, based on the transmission mode. According to some embodiments, the pattern repetition number in the EHT-SIG field of the EHT ER PPDU may depend on the transmission mode. For example, as described above with reference to FIGS. 11A through 11D, two types of EHT-SIG content channels may be repeated in multi-user OFDMA transmission, single-user OFDMA transmission, and multi-user non-OFDMA transmission, and, as described above with reference to FIGS. 12A through 12D, a common EHT-SIG content channel may be repeated in a single-user non-OFDMA transmission or sounding NDP. Accordingly, when the access point 281 sets the number of repetitions of a pattern to be n in transmission to a single user or a sounding NDP, the access point 281 may set the number of repetitions of a pattern to be 2n in transmission to multiple users (where n is an integer greater than 1). Accordingly, the number of repetitions of a pattern in the EHT-SIG field may be determined according to the transmission mode, and the PPDU type and compression mode field may implicitly indicate the number of repetitions of a pattern.

In operation S401, a station 282 may identify the transmission mode, based on the value of a mode field. As described above with reference to FIG. 14, the U-SIG-2 and the U-SIG-2-R may include a PPDU type and compression mode field, and the access point 282 may identify the transmission mode, based on the value of the PPDU type and compression mode field with reference to the table of FIG. 15.

In operation S402, the station 282 may identify a pattern repetition number, based on the transmission mode. As described above, the pattern repetition number in the EHT-SIG field may depend on the transmission mode, and the station 282 may identify a pattern repetition number corresponding to the transmission mode identified in operation S401.

Figure 29:
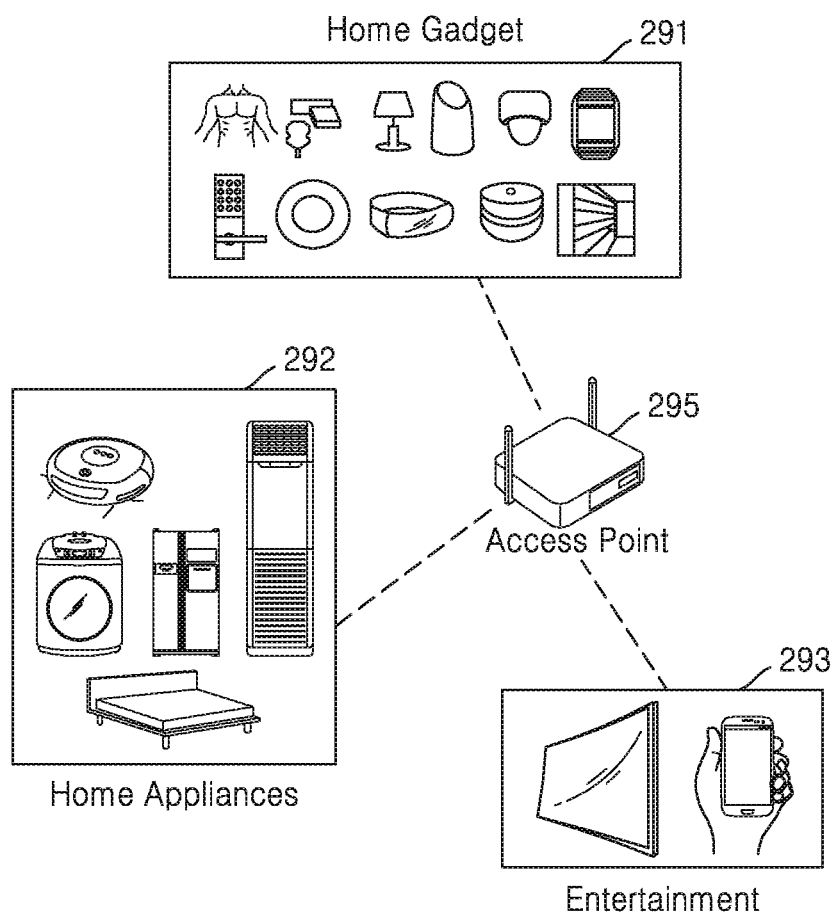
FIG. 29 is a block diagram of examples of an apparatus for wireless communication according to an embodiment.

FIG. 29 is a block diagram of examples of an apparatus for wireless communication according to an embodiment. In detail, FIG. 29 illustrates an Internet of Things (IoT) network system that includes a home gadget 291, home appliances 292, an entertainment device 293, and an access point 245.

According to some embodiments, apparatuses for wireless communication of FIG. 29 may support extended range transmission, as described above with reference to the drawings. Accordingly, apparatuses for wireless communication may transmit or receive a preamble including extended signal fields. An extended signal field may include repeated patterns, and an apparatus that has received the extended signal field may extract information through combination of the patterns. According to some embodiments, the pattern repeated in the signal field may be a symbol block including OFDM symbols and/or an encoded block. The number of repetitions of the pattern may be explicitly or implicitly indicated through a field included in the signal field. Accordingly, extended range transmission may be possible in a WLAN system, and coverage of the WLAN system may be extended.

Various functions described above may be implemented or supported by artificial intelligence technology or one or more computer programs, and each of the programs is formed of computer-readable program code and is executed in a computer-readable recording medium. "An application" and "a program" refer to one or more computer programs, software components, instruction sets, processes, functions, objects, classes, instances, related data, or parts thereof suitable for implementation of pieces of computer-readable program code. "Computer-readable program code" include all types of computer code including source code, object code, and execution code. "Computer-readable media" include all types of media that may be accessed by a computer such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-temporary computer-readable media include a medium in which data may be permanently stored and a medium in which data may be stored and may be overwritten later such as a rewritable optical disk or a deletable memory device.

While the inventive concept has been particularly shown and described with reference to embodiments thereof, it will be understood that various changes in form and details may be made therein without departing from the spirit and scope of the following claims.

What is claimed is:

1. A wireless communication method performed by a first apparatus, the wireless communication method comprising:
generating a first signal field having a fixed length;
generating a second signal field having a variable length; and
transmitting a physical layer protocol data unit (PPDU) including the first signal field and the second signal field to a second apparatus,
wherein said generating the second signal field comprises:
generating a bitstream;
generating an encoded block by encoding the bitstream;
generating an encoded block sequence by repeating the encoded block;
generating a modulated block by modulating the encoded block sequence; and
generating the second signal field to include one or more orthogonal frequency-division multiplexing (OFDM) symbols from the modulated block,
wherein the first signal field includes version-independent fields and version-dependent fields, and
wherein the second signal field includes a common field and a user specific field.

2. The wireless communication method of claim 1,
wherein said generating the encoded block sequence comprises:
determining a number of padding bits to be included within the encoded block sequence, based on a length of repeated encoding blocks and a number of bits to be represented by the OFDM symbol; and
generating the encoded block sequence including the repeated encoding blocks and selectively including the determined number of padding bits.

3. The wireless communication method of claim 2, wherein said generating the encoded block comprises:
encoding the bitstream;
generating at least one padding bit, based on a length of the encoded bitstream and a length of a modulated symbol; and
generating the encoded block including the encoded bitstream and including the at least one padding bit.

4. The wireless communication method of claim 1, wherein a padding field is omitted from a plurality of fields included in the bitstream, and
a padding bit is omitted from the bitstream.

5. The wireless communication method of claim 1, wherein the first signal field includes a number of encoded blocks field indicating the number of repetitions of the encoded block.

6. The wireless communication method of claim 5, wherein the generating the first signal field including the number of encoded blocks field comprises:
generating first and second OFDM symbols modulated from first encoded bits according to different schemes, respectively;
generating third and fourth OFDM symbols modulated from second encoded bits according to a common scheme; and
generating the first signal field including the first through fourth OFDM symbols,
wherein the number of encoded blocks field is included in the first encoded bits.

7. The wireless communication method of claim 1, wherein the generating the encoded block sequence comprises determining the number of repetitions of the encoded block, based on a transmission mode of the PPDU.

8. The wireless communication method of claim 7,
wherein said determining the number of repetitions of the encoded block comprises:
determining the number of repetitions to be n, when the transmission mode corresponds to single user (SU) non-orthogonal frequency-division multiple access (non-OFDMA) transmission; and determining the number of repetitions to be 2n, when the transmission mode corresponds to OFDMA transmission or multi-user (MU) non-OFDMA transmission, wherein n is an integer greater than 0.

9. A wireless communication method performed by a second apparatus, the wireless communication method comprising:

receiving, from a first apparatus, a physical layer protocol data unit (PPDU) including a first signal field having a fixed length and a second signal field having a variable length;

identifying first information included in the first signal field, based on a pattern repeated in the first signal field;

identifying second information included in the second signal field, based on a pattern repeated in the second signal field; and processing the PPDU, based on the first information and the second information, wherein said identifying the second information comprises:

recovering a modulated block from at least one orthogonal frequency-division multiplexing (OFDM) symbol of the second signal field; and identifying at least one repeated encoded block by demodulating the modulated block, wherein the first signal field includes version-independent fields and version-dependent fields, and wherein the second signal field includes a common field and a user specific field.

10. The wireless communication method of claim 9, wherein said identifying the at least one repeated encoded block comprises:

recovering an encoded block sequence by demodulating the modulated block; and removing at least one padding bit from the encoded block sequence.

11. The wireless communication method of claim 10, wherein said identifying the second information further comprises removing at least one padding bit from the encoded block.

12. The wireless communication method of claim 9, wherein said identifying the first information comprises extracting a number of encoded blocks field indicating a number of repetitions of the encoded block or a total number of the encoded blocks from the first signal field.

13. The wireless communication method of claim 12, wherein said extracting the number of encoded blocks field comprises:

identifying a first OFDM symbol modulated according to a first modulation scheme, from the first signal field;

identifying a second OFDM symbol modulated according to a second modulation scheme, from the first signal field;

generating a common encoded block from the first and second OFDM symbols; and extracting the number of encoded blocks field by decoding the common encoded block.

14. The wireless communication method of claim 9, wherein said identifying the first information comprises:

extracting a mode field from the first signal field; and identifying the number of repetitions of the encoded block, based on a value of the mode field; and wherein said identifying the number of repetitions of the encoded block comprises:

identifying the number of repetitions of the encoded block as a first number when the mode field indicates a transmission mode corresponding to single user (SU) non-orthogonal frequency-division multiple access (non-OFDMA) transmission; and identifying the number of repetitions of the encoded block as a second number different from the first number when the mode field indicates a transmission mode corresponding to OFDMA transmission or multi-user (MU) non-OFDMA transmission.

15. A second apparatus for wireless communication, the second apparatus comprising:

a transceiver; and a processing circuit configured to receive, from a first apparatus via the transceiver, a physical layer protocol data unit (PPDU) including a first signal field having a fixed length and a second signal field having a variable length, wherein the second signal field includes at least one orthogonal frequency-division multiplexing (OFDM) symbol representing a block sequence including an encoded block and one or more repetitions of the encoded block, wherein the first signal field includes version-independent fields and version-dependent fields, and wherein the second signal field includes a common field and a user specific field.

16. The second apparatus of claim 15, wherein the first signal field comprises:

first and second OFDM symbols modulated from first encoded bits according to different modulation schemes, respectively; and third and fourth OFDM symbols modulated from second encoded bits according to a common modulation scheme.

17. The second apparatus of claim 16, wherein the first encoded bits include a number of encoded blocks field indicating the number of the one or more repetitions of the encoded block or a total number of encoded blocks within the block sequence.

18. The second apparatus of claim 15, wherein the first signal field includes a mode field, and the number of the one or more repetitions of the encoded block depends on a value of the mode field.

* * * * *